United States Patent
Martinez-Duarte et al.

(10) Patent No.: US 10,821,654 B2
(45) Date of Patent: Nov. 3, 2020

(54) CARBON AND CARBIDE ORIGAMI

(71) Applicant: CLEMSON UNIVERSITY, Clemson, SC (US)

(72) Inventors: Rodrigo Martinez-Duarte, Clemson, SC (US); Monsur Islam, Clemson, SC (US); Joshua Flach, Clemson, SC (US)

(73) Assignee: Clemson University Research Foundation, Clemson, SC (US)

( * ) Notice: Subject to any disclaimer, the term of this patent is extended or adjusted under 35 U.S.C. 154(b) by 86 days.

(21) Appl. No.: 16/157,167

(22) Filed: Oct. 11, 2018

(65) Prior Publication Data

US 2019/0112191 A1 Apr. 18, 2019

Related U.S. Application Data

(60) Provisional application No. 62/571,379, filed on Oct. 12, 2017.

(51) Int. Cl.
| | |
|---|---|
| *B29C 53/04* | (2006.01) |
| *C01B 32/90* | (2017.01) |
| *C01B 32/05* | (2017.01) |
| *B29C 53/22* | (2006.01) |
| *B29C 53/06* | (2006.01) |
| *B29C 53/24* | (2006.01) |
| *B29C 71/02* | (2006.01) |
| *B29B 15/10* | (2006.01) |

(52) U.S. Cl.
CPC .............. *B29C 53/04* (2013.01); *B29B 15/10* (2013.01); *B29C 53/06* (2013.01); *B29C 53/063* (2013.01); *B29C 53/22* (2013.01); *B29C 53/24* (2013.01); *B29C 71/02* (2013.01); *C01B 32/05* (2017.08); *C01B 32/90* (2017.08); *B29C 2071/022* (2013.01)

(58) Field of Classification Search
CPC ....... B29C 53/04; B29C 53/06; B29C 53/063; B29C 53/066; B29C 53/22; B29C 53/24; B29C 71/02; B29C 2071/022; B29B 15/10
See application file for complete search history.

(56) References Cited

U.S. PATENT DOCUMENTS

| | | |
|---|---|---|
| 3,744,384 A | 7/1973 | Jarritt |
| 4,641,575 A | 2/1987 | Cavagna |
| (Continued) | | |

OTHER PUBLICATIONS

Silverberg et al., Using origami design principles to fold reprogrammable mechanical metamaterials, Science 345 (6197), 647-650, 2014. (Year: 2014).*

(Continued)

*Primary Examiner* — Atul P. Khare
(74) *Attorney, Agent, or Firm* — Dority & Manning, P.A.

(57) ABSTRACT

Methods for forming carbon-based cellular structures and 3D structures that can be formed by use of the methods are described. Methods include shaping an essentially 2D sheet that includes an organic polymer to form a 3D precursor followed by heat treatment of the 3D precursor. Heat treatment carbonizes the polymer to form an amorphous carbon. A metal precursor solution can be applied to the 3D precursor, and subsequent heat treatment can form a metal carbide, metal nanoparticles, or other carbon-based materials on/in the cellular structures.

12 Claims, 16 Drawing Sheets

(56) References Cited

U.S. PATENT DOCUMENTS

| | | | |
|---|---|---|---|
| 2002/0081926 A1* | 6/2002 | Goering | B29C 70/222 |
| | | | 442/218 |
| 2005/0215405 A1 | 9/2005 | Corcoran | |
| 2012/0125071 A1* | 5/2012 | Schroers | B22F 3/006 |
| | | | 72/364 |
| 2012/0301695 A1* | 11/2012 | Gojny | B29C 70/207 |
| | | | 428/219 |
| 2018/0281341 A1* | 10/2018 | Granberg | B32B 29/005 |

OTHER PUBLICATIONS

Inagaki et al., Aromatic Polyimides as Carbon Precursors, Carbon 61, 1-21, 2013. (Year: 2013).*

Ahn et al., Printed Origami Structures, Adv. Mater. 2010, 22, 1-4. (Year: 2010).*

Islam, M., Carbon and Carbide Origami, Clemsen University, Department of Mechanical Engineering, 3 pages, Nov. 10, 2016. (Year: 2016).*

Ashby, et al. "Engineering Materials 2" Elsevier Butterworth-Heinemann, Waltham, MA, 2013.

Ashby, M.F. "The Properties of Foams and Lattices" Philos. Trans. A. Math. Phys. Eng. Sci. 364(1838), 2006, pp. 15-30.

Baker, et al. "The Electrical Conductivity and Hall Effect of Glassy Carbon" J. Non. Cryst. Solids 58, 1983, pp. 57-90.

Bauer, et al. "Approaching theoretical strength in glassy carbon nonolattices" Nat. Mater. 15, 2016, pp. 438-444.

Byrne, et al. "Carbonization of wood for advanced materials applications" Carbon 35(2), 1997, pp. 259-266.

Celik, et al. "The use of tincal calcination plant waste as an additive in ceramic wall tile production" J. Ceram. Process. Res. 15(6), 2014, pp. 508-513.

Cheung, et al. "Origami interleaved tube cellular materials" Smart Mater. Struct. 23, 2014, 94012, pp. 1-10.

Cowlard, et al. "Vitreous carbon—A new form of carbon" J. Mater. Sci. 2(6), 1967, pp. 507-512.

Daud, et al. "The effects of carbonization temperature on pore development in palm-shell-based activated Carbon" Carbon 38, 2000, pp. 1925-1932.

Deshpande, et al. "Collapse of truss core sandwich beams in 3-point bending" Int. J. Solids Struct. 38, 2001, pp. 6275-6305.

Dickens, B. "Thermally degrading polyethylene studied by means of factor-jump thermogravimetry" J. Polym. Sci. Polym. Chem. Ed. 1982, 20, 1065.

Fischer, et al. "Mechanical tests for foldcore base material properties" Compos. Part A Appl. Sci. Manuf. 40, 2009, 1941.

Gallego, et al. "Carbon foams for thermal management" Carbon 41, 2003, pp. 1461-1466.

Gibson, et al. "Cellular Solids: Structure and Properties" Cambridge University Press, 1997.

Giuliani, et al. "Development and Characterization of Carbon Based Electrodes from: Pyrolyzed Paper for Biosensing Applications" J. Electroanal. Chem. 765, 2016. pp. 8-15.

Gyrres, et al. Sci. Papermak Trans. XIIth Fund. Res. Symp. Oxford, UK, 2001, pp. 1371-1383.

Harikrishnan, et al. "Reticulated vitreous carbon from polyurethane foam-clay composites" Carbon 45, 2007, pp. 531-535.

Heimbs, et al. "Sandwich structures with textile-reinforced composite foldcores under impact loads," Compos. Struct. 92(6), 2010, pp. 1485-1497.

Hubbe, et al. "What Happens to Cellulosic Fibers During Papermaking and Recycling: A Review" BioResources 2(4) 2007, pp. 739-788.

Hucke, et al. "Glassy carbon: A potential dental implant material" J. Biomed. Mater. Res. Part A 7(3), 1973, pp. 263-274.

Inagaki, et al. "Carbon foam: Preparation and application" Carbon 87, 2015, pp. 128-152.

Islam, et al. "Enrichment of diluted cell populations from large sample volumes using 3D carbon-electrode dielectrophoresis" Biomicrofluidics 10, 2016, 033107 pp. 1-14. DOI 10.1063/1.4954310.

Istrate, et al. "Relative modulus—relative density relationships in low density polymer-clay nanocomposite foams" Soft Matter 7, 2011, pp. 1840-1848.

Jana, et al. "Biomass-derived, thermally conducting, carbon foams for seasonal thermal storage" Biomass and Bioenergy 67, 2014, pp. 312-318.

Johnson, T. "Diesel Emission Control in Review" SAE Int. 2007-01-0233, 2007.

Kwon, et al. "Electrospun nano- to microfiber fabrics made of biodegradable copolyesters: structural characteristics, mechanical properties and cell adhesion potential" Biomaterials 26(18), 2005, pp. 3929-3939.

Leventis, et al. "Nanoengineering Strong Silica Aerogels" Nano Lett. 2(9), 2002, pp. 957-960.

Li, et al. "Study on structural and mechanical properties of porous PLA nanofibers electrospun by channel-based electrospinning system" Polym. 56, 2015, pp. 572-580.

Li, et al. "Effects of carbonization temperatures on characteristics of porosity in coconut shell chars and activated carbons derived from carbonized coconut shell chars" Ind. Crops Prod. 28(2), 2008, pp. 190-198.

Li, et al. "Real-time evolved gas analysis by FTIR method: an experimental study of cellulose pyrolysis" Fuel 80(12), 2001, pp. 1809-1817.

Liang, et al. "Carbon Microfibers with Hierarchical Porous Structure from Electrospun Fiber-Like Natural Biopolymer" Sci. Rep. 3:1119, 2013, pp. 1-5.

Liu, et al. "Preparation of a Carbon-Based Solid Acid Catalyst by Sulfonating Activated Carbon in a Chemical Reduction Process" Molecules 15, 2010, pp. 7188-7196.

Liu, et al. "An approach to carton-folding trajectory planning using dual robotic fingers" Rob. Aloe, Syst. 42(1), 2003, pp. 47-63.

Lopez-Gonzalez, et al. "Preparation and Characterization of Active Carbons from Olive Stones" Carbon 18, 1980, pp. 413-418.

Lv, et al. "Origami based Mechanical Metamaterials" Sci. Rep. 4:5979, 2014, 1-6.

Matweb, "Vitreous Carbon (Glassy Carbon)," can be found under http://www.matweb.com/search/datasheet.aspx?matguid=2f4d47d4e39d4091baa8625d4ed46cb1&ckck=1, n.d. (Web).

Madou, et al. "Carbon: The Next Silicon? Book 2—Applications" Momentum Press, 2016.

Manocha, et al. "Development of carbon foam from phenolic resin via template route" Indian J. Eng. Mater. Sci. 17, 2010, pp. 338-342.

Mettler, et al. "Revealing pyrolysis chemistry for biofuels production: Conversion of cellulose to furans and small oxygenates" Energy Environ. Sci. 5(1), 2012, pp. 5414-5424.

Munawar, et al. "Characterization of the morphological, physical, and mechanical properties of seven nonwood plant fiber bundles" J. Wood Sci. 53(2), 2007, pp. 108-113.

Namiki, et al. "Robotic Origami Folding with Dynamic Motion Primitives" IEEE Int. Conf. Intell. Robot. Syst. 2015, pp. 5623-5628.

Natu, et al. "Shrinkage Analysis of Carbon Micro Structures Derived from SU-8 Photoresist" ECS Trans. 72(1), 2016, pp. 27-34.

Pai, et al. "Mechanical properties of individual electrospun PA 6(3)T fibers and their variation with fiber diameter" Polymer 52(10), 2011, pp. 2295-2301.

Palmre, et al. "Electroactive polymer actuators with carbon aerogel electrodes" J. Mater. Chem. 21(8), 2011, pp. 2577-2583.

Pekala, et al. "Organic aerogels: microstructural dependence of mechanical properties in compression" J. Non. Cryst. Solids 125(1-2), 1990, pp. 67-75.

Poletto, et al. "Crystalline properties and decomposition kinetics of cellulose fibers in wood pulp obtained by two pulping processes" Polym. Degrad. Stab. 96, 2011, pp. 679-685.

Qin, et al. "The mechanics and design of a lightweight three-dimensional graphene assembly" Sci. Adv. 3:e1601536, 2017, pp. 1-8.

(56) References Cited

OTHER PUBLICATIONS

Rasi, M. "Permeability Properties of Paper Materials" University of Jyvaskyla, 2013.
Roy, et al. "Preparation of a Binder-Free Three-Dimensional Carbon Foam/Silicon Composite as Potential Material for Lithium Ion Battery Anodes" *ACS Appl. Mater. Interfaces* 8(11), 2016, pp. 7343-7348.
Schaedler, et al. "Ultralight Metallic Microlattices" *Science* 2334, 2011, pp. 962-965.
Schenk, et al. "Geometry of Miura-folded metamaterials" *Proc. Natl. Acad. Sci.* 110(9), 2013, pp. 3276-3281.
Schueller, et al. "Fabrication of glassy carbon microstructures by soft lithography" *Sensors and Actuators A72*, 1999, pp. 125-139.
Schueller, et al. "Fabrication and Characterization of Glassy Carbon MEMS" *Chem. Mater.* 19, 1997, pp. 1399-1406.
Sharma, et al. "Porous glassy carbon formed by rapid pyrolysis of phenol-formaldehyde resins and its performance as electrode material for electrochemical double layer capacitors" *J. Anal. Appl. Pyrolysis* 2108, 2014, pp. 12-18.
Shemet, et al. "High Temperature Oxidation Behavior of Carbon Materials in Air" *Carbon*, 31(81), 1993, pp. 1-6.
Shen, et al. "The overview of thermal decomposition of cellulose in lignocellulosic biomass" *Cellul. Biomass Convers.*, 2013, pp. 193-226.
Smothers, et al. *Appl. Refract. Ceram. Eng. Sci. Proc.*, 1987, pp. 63-74.
Su, et al. "Effects of carbonisation atmosphere on the structural characteristics and transport properties of carbon membranes prepared from Kapton® polyimide" *J. Memb. Sci.* 305, 2007, pp. 263-270.
Szczurek, et al. "Carbon periodic cellular architectures" *Carbon* 88, 2015, pp. 70-85.
Tachi, T. "Geometric Considerations for the Design of Rigid Origami Structures" *Proceedings Int. Assoc. Shell Spat. Struct. Syrup.* 2010, (12 pages).
Tanaka, et al. "Origami folding by a robotic hand" *IEEE Int. Conf. Intell. Robot. Syst.* 2007, 2540.
Tetxidor, et al. "Carbon microelectromechanical systems as a substratum for cell growth" *Biomed. Mater.* 3:034116, 2008, pp. 1-8.
Tondi, et al. "Tannin-based carbon foams" *Carbon* 247, 2009, pp. 1480-1492.
Wang, et al. "Fabrication and characterization of micro PEM fuel cells using pyrolyzed carbon current collector plates" *J. Power Sources* 195(15), 2010, pp. 4796-4803.
Wei, et al. "Exchange-Coupling-Induced Symmetry Breaking in Topological Insulators" *Phys. Rev. Lett.* 110(18), 2013, pp. 1-5.
Worsley, et al. "Mechanically robust and electrically conductive carbon nanotube foams" *Appl. Phys. Lett.* 94:073115, 2009, pp. 1-3.
Yasuda, et al. "Formation of rarefaction waves in origami-based metamaterials" *Phys. Rev. E* 93(4), 2016, pp. 1-9.
Zhang, et al. "A carbon-supported Pd-P catalyst as the anodic catalyst in a direct formic acid fuel cell" *J. Power Sources* 162(1), 2006, pp. 177-179.
Zhao, et al. "Development of a paper-bag-folding machine using open architecture for adaptability" *Proc. Inst. Mech. Eng. Part B J. Eng. Manuf.* 229(S1), 2015, pp. 155-169.
Zhao, et al. "The fracture toughness of glassy carbons at elevated temperatures" *Carbon* 23(1), 1985, pp. 15-18.
Zheng, et al. "Ultra-light, Ultra-stiff Mechanical Metamaterials" *Science* 344(6190), 2014, pp. 1373-1377.

\* cited by examiner

CARBON AND CARBIDE ORIGAMI

CROSS REFERENCE TO RELATED APPLICATION

This application claims filing benefit of U.S. Provisional Patent Application Ser. No. 62/571,379 having a filing date of Oct. 12, 2017, which is incorporated herein by reference for all purposes.

BACKGROUND

In mechanical engineering applications, cellular materials (also referred to herein as cellular structures) are defined by an interconnected network of solid struts and plates forming the edges and faces, respectively, of cells in either a periodic pattern or in a random, i.e., stochastic, arrangement. Both natural and synthetic cellular materials are common with periodic as well as stochastic structures. Natural periodic cellular materials include, for example, wood and cork, with trabecular bone, plant parenchyma, and sponge being examples of natural stochastic structures. Examples of synthetic stochastic cellular materials include silica aerogels, foams (e.g., nanotube, metallic, polymer, and carbon foams), and graphene elastomers. Synthetic micro- and nanolattices represent examples of synthetic periodic cellular materials.

Cellular structures exhibit a much lower density compared to the bulk version of the same material. Additionally, cellular structures offer an improved specific surface area and specific mechanical strength. As such, cellular materials are found in many applications, for instance as lightweight structural components, energy absorption materials, catalysts supports, and performance filters, just to name a few.

Cellular carbon structures have been formed from different carbon allotropes such as carbon nanotubes (CNT), graphene, vitreous carbon (also referred to as glassy carbon), and carbons derived from organic precursors. In general, cellular carbon structures feature low density, high specific compressive strength, high temperature tolerances (e.g., about 3000° C. in inert atmosphere), high surface area and adjustable electrical and thermal conductivity. Such properties have enabled the use of cellular carbon materials in thermal energy storage, adsorption of water vapor, electrochemical measurements, heat sinks and catalyst supports, among others.

What are needed in the art are methods for forming cellular structures of carbon-based materials that are economical and scalable and that can be used to form tailored cellular structures with desirable characteristics for application in a wide variety of fields.

SUMMARY

According to one embodiment, disclosed is a method for forming a cellular structure. A method can include shaping an essentially two dimensional (2D) sheet or film that includes an organic polymer, e.g., a biopolymer, to form a precursor. The precursor can have a three-dimensional (3D) shape that includes a plurality of individual cells. Following the shaping step, a method can include heat treating the shaped precursor at a temperature of about 600° C. or greater in inert atmosphere, the heat treatment can carbonize and densify the organic material of the precursor and form a carbon-based cellular structure, e.g., a carbon cellular structure that includes an allotrope of carbon and/or a reactant of carbon, e.g., a carbide or a carbon nitride. The method can optionally include pretreatment of the essentially 2D sheet or the 3D precursor prior to the heat treatment step. For instance, a method can include application of a metal precursor (e.g., a solution of a metal salt) to the sheet either prior to or following the shaping of the precursor. During the heat treatment step, the metal of the metal precursor can react with carbon of the 3D precursor to form a reaction product, e.g., a metal carbide. In other embodiments, the metal of the metal precursor can be reduced to form metal nanoparticles on the surface of the heat treated, carbon-based cellular material. In another embodiment, carbon of the carbonized material can react with components of the heat treatment environment, e.g., nitrogen, to form a carbon reaction product, e.g., carbon nitride in/on the carbon-based structure.

Also disclosed are cellular structures that can be formed by use of the method. For instance, a 3-D cellular structure can include an allotrope of carbon forming some or all of the cells of the structure. The cells of the structure can be periodic or stochastic. In one embodiment, the cellular structure can include vitreous carbon, optionally in conjunction with additional materials. For instance, in one embodiment, a cellular structure can include metal nanoparticles decorating the surface of a carbon-based cellular structure. In other embodiments, the cellular structure can include a reaction product of carbon and a secondary reaction, e.g., a metal carbide or a carbon nitride. The carbon-based cellular materials can exhibit very low densities, for instance about 0.1 g/cm$^3$ or less with high compressive strength, e.g., about 4 kPa or higher as well as high elastic modulus, e.g., about 50 kPa or higher.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Figure 1:
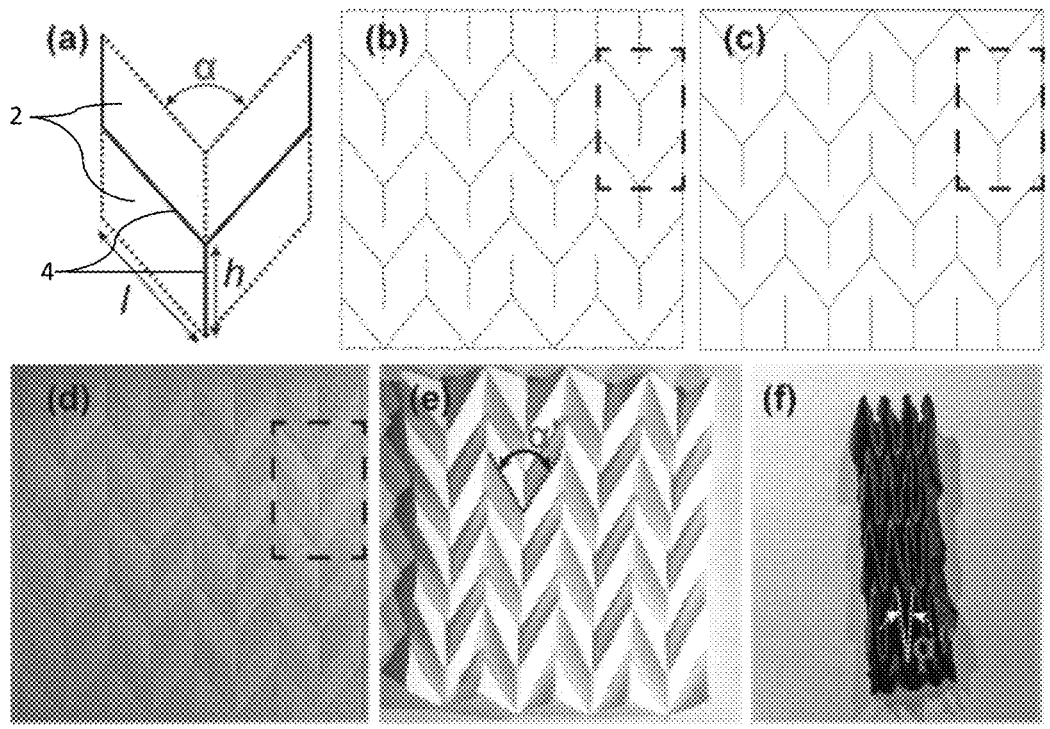
FIG. 1 illustrates fabrication steps for a cellular structure including a schematic illustration of a unit cell (a), a schematic of the unit cell shown on a larger essentially 2D sheet including the crease patterns for "valleys" (b) and "mountains" of the origami-based structure (c), image of a creased sheet (d), image of a folded cellulose-based 3D precursor (e), and a carbonized cellular structure (f) formed upon heat treatment of the 3D precursor.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In general, disclosed are methods for forming carbon-based cellular structures and 3D structures that can be formed by use of the methods. More specifically, disclosed methods include shaping an essentially 2D sheet that includes an organic polymer to form a 3D precursor followed by heat treatment of the 3D precursor. Through selection of the characteristics of the 2D organic sheet used to form the precursor, pattern selection of the 3D precursor, heat treatment control, and selection of pre- and/or post-heat treatment steps, a carbon-based cellular structure can be formed having physical and mechanical characteristics that would have been difficult or impossible to attain by previous methods of forming carbon-based cellular structures.

The carbon-based cellular structures are formed by shaping an essentially 2D sheet or film that includes and organic polymer. As utilized herein, the term "sheet" or "film" is intended to refer to a structure having a thickness, a width and a height, with the width and height being at least one order of magnitude greater than the thickness of the sheet. For instance, a sheet can generally have a thickness of from about 5 micrometers (μm) to about 1 mm, and can be flexible so as to be capable of being folded to form a 3D shape. The height and width dimensions defining the surface area of the starting sheet are not limited to any particular size and can be from a few centimeters to several meters. The only requirement of a precursor sheet is that it incorporates an organic polymer as a carbon source and that it can be folded either manually or automatically so as to be shaped in the form of a three dimensional structure.

While the organic polymer of the sheet is not particularly limited, in one embodiment the sheet can incorporate a biopolymer, i.e., a polymer obtained or derived from a natural source. Biopolymers can be attractive as a carbon source as they can be inexpensive and renewable. For instance, in one embodiment, a sheet can incorporate a polysaccharide, and in one particular embodiment cellulose. Cellulose can be selected in one embodiment as it is the most abundant biopolymer in nature, with an approximate global production of 5×10¹¹ metric tons, and due to the maturity of the paper-making industry, it is possible to produce relatively inexpensive cellulose-based sheet materials at high cellulose content.

As utilized herein, "cellulose" refers to a polysaccharide that includes a linear chain of β(1→4) linked D-glucose units. A cellulose-based sheet-like precursor material can be derived from any source including, without limitation, plant-based cellulose, bacterial cellulose, and synthetic cellulose as well as combinations of different cellulose-based fibers. Various kinds of natural fibers may be used in the making of the cellulose-based precursors, such as wood pulp fibers, corn silk, hemp, flax, rice, or cotton fibers, as well as other plant cellulose sources. For example, in one embodiment a pure cellulose paper with a random structure such as may be utilized as chromatography paper may be utilized as a cellulose-based precursor sheet.

In another embodiment, the carbon source can include bacterial cellulose. Bacterial cellulose can be derived from any suitable bacterial source. Microorganisms that produce bacterial cellulose can include, without limitation, *Acetobacter pasteurianus, Acetobacter aceti, Acetobacter xylinum* (also referred to as *Gluconoacetobacter xylinus* and *Komagataeibacter xylinus*), *Acetobacter rancens, Sarcina ventriculi, Bacterium xyloides, Candida albicans*, and bacteria belonging to the genus *Pseudomonas*, the genus *Agrobacterium*, the genus *Rhizobium*, etc. By way of example, *Acetobacter xylinum* produces a mat-shaped cellulose which can be used as a cellulose-based precursor. *Acetobacter aceti* produce bacterial cellulose composed of ribbon-shaped microfibrils (generally about 1 nm to about 20 nm in thickness and about 10 nm to about 50 nm in width) that can be utilized in forming or as a component of a cellulose-based precursor sheet.

Bacterial cellulose can be produced as floc or suspended matter in a form of sheet, dispersion, grain or the like by static culture or aeration agitation culture, which can be selected so as to effect entangling of fibers.

In one embodiment, the carbon source can include starch. After cellulose, starch is the second most abundant biopolymer in nature and thus starch-based sheets, e.g., rice paper, are available at a large variety of weights and content and at reasonably cost. Starch refers to a polysaccharide including amylose and amylopectin in various relative amounts that varied depending upon the source. For instance, and depending upon the plant source, starch can generally include about 20% to about 25% amylose and about 75% to about 80% amylopectin by weight. Amylose is a linear chain of glucose units linked by α-1,4-D-glucosidic bonds with a degree of polymerization (DoP) up to about 6000, while amylopectin contains short chains of α-1,4 glucose units and long chains of α-1,6 glucose units with a DoP of about 15 to about 45.

The mechanical properties of a material are known to depend on its microstructure, and the mechanical properties of the final carbon-based products can likewise depend upon the microstructure of the starting materials. For example, the compressive strength ($\sigma_m$) and elastic modulus (E) of the carbon-based cellular structures can vary depending on the fiber composition, fiber diameter and fiber spacing of a starting sheet. Without wishing to be bound to any particular theory, it is believed that a high standard deviation in fiber diameter and random and wide distribution open pores in a starting material can lead to a high standard deviation in $\sigma_m$ and E in a final product cellular structure. Modification of mechanical properties can thus be controlled in one embodiment through selection of the matrix characteristics of a starting fibrous sheet, e.g., fiber diameter size, density of the fibrous matrix, etc., which can modify the pore size between fibers of the final structures.

When considering a natural cellulose source, e.g., paper, characteristics including fiber dimension and spatial arrangement depends on the source of the wood pulp, pulping method, treatment of the pulp and the mechanical pressing. Different microstructure of a paper can be obtained by controlling such processing steps. For example, fibers from soft-wood feature slenderness ratio (length/diameter) ranging from about 95 to about 120, whereas fibers from hardwood have a smaller slenderness ratio, generally ranging from about 55 to about 75. Higher slenderness ratio can translate to a higher density paper and lower pore size distribution, which can be reflected in the final carbon-based cellular structure. Furthermore, paper made from thermo-mechanical pulping possesses can exhibit about 25% to about 40% higher porosity as compared to that formed via chemical pulping. The maturity of the paper industry represents an excellent stepping stone toward manufacturing highly tailored properties in the carbon-based cellular products.

Similarly, the carbon source itself can provide variations in the microstructure of the sheet and thus the microstructure of the product. For instance, when considering bacterial cellulose sources, bacteria adopt a random 3D motion in the culture, and as such the microstructure of a bacterial cellulose-based sheet will differ from a plant cellulose-based sheet. In contrast to a cellulose-based sheet, the cellulose fibers in a bacterial cellulose-based sheet are not hollow, feature an average fiber diameter of from about 50 to about 100 nm, and the average spacing between the fibers ranges from about 10 nm to about 50 nm. Bacterial cellulose is also reported to exhibit higher purity, DoP and crystallinity when compared to plant cellulose. For example, bacterial cellulose features a DoP ranging from about 11000 to about 17000, compared to about 300 to about 1700 for plant cellulose. Furthermore, due to the nanofibril structure, bacterial cellulose features a surface area about 200 times higher than the plant cellulose fibers. Because of these properties, the cellular structures derived from bacterial cellulose can exhibit different properties as compared to cellular structures derived from plant cellulose or from another carbon source, including other biopolymer carbon sources.

Other biopolymer materials can exhibit a very different microstructure. For instance, the microstructure of rice paper, a starch-based starting material, resembles a dried paste-like morphology as discussed further herein. This microstructure of the starting material can lead to varied characteristics of the final carbon-based cellular material, which can be used to advantage in designing a carbon-based cellular structure with predetermined, desired mechanical characteristics.

The shape and dimensions of the material microstructure can have an important role on its mechanical properties. For example, the elastic modulus of an entanglement of fibers can be characterized by the relation among the number of fiber segments in a unit sectional area, the distance between the connecting/support point of the fibers (length of suspended fiber segment) and the properties of a single fiber. Upon loading, the stress is transferred through the structure until focusing on the fibers themselves, which emphasizes the importance of the fiber properties and the length of the suspended fibers. Thus selection of precursor material can affect the modulus of the product structure, while the density of materials (e.g., fibers) in the microstructure can determine the length of suspension. Hence, the choice of precursor yields different carbon microstructures that can enable quite different performance in the product cellular structure. The choice of precursor material can also determine the base microstructure that will serve as scaffold for product materials (e.g., metal carbides).

The starting sheet material can include additives in addition to the organic polymer carbon source. For instance, a starch-based sheet, such as a rice paper can include different flours in addition to rice flour, e.g., tapioca flour as well as additives such as proteins, baking powder, vitamins, other polysaccharides (e.g., glucose) and salts. Starch-based materials can also have a relatively high water content, as amylopectin has high affinity to bind with water molecules due to abundant —OH groups on its surface. For instance, starch can absorb moisture up to about 13% of its overall weight at room temperature. As such, a starch-based starting sheet can swell upon immersion in water, yielding a soft, pliable film that enables its shaping in the wet state that will maintain such shape after drying.

Of course, carbon sources for the disclosed structures are not limited to biopolymers or to cellulose or starch-based materials. Other biopolymers as may be utilized as the carbon source in the starting 2D sheets can include, without limitation, chitin, carrageenan, pectins, fibrin, collagen, polyhydroxyalanoates (e.g., poly(hydroxybutyrate), poly (hydroxyvalerate)), poly(lactic acids), polycaprolactones, polyesteramides, etc.

A starting sheet material can be pre-treated prior to heat treatment and carbonization of the organic polymer. A pretreatment can be carried out either prior to or following shaping of a sheet to form the desired 3D shape of the carbon-based cellular structure.

For example, in one embodiment, a precursor can be applied to the sheet that during the heat treatment can provide a reactant, e.g., a metal, that can react with elemental carbon to generate a desired material, e.g., a metal carbide, in the cellular structure.

In one embodiment, a solution of a metal salt or metal oxide can be applied to the sheet that can be reduced during heat treatment, e.g., via carbothermal reduction, to provide an elemental metal that can then react with carbon to provide a metal carbide. For instance, a metal salt such an ammonium salt or the like, of a metal suitable for the formation of a metal carbide such as, without limitation, scandium, yttrium, titanium, zirconium, hafnium, vanadium, niobium, tantalum, chromium, molybdenum, tungsten, boron, aluminum, silicon, and the like.

During heat treatment, the precursor solution, e.g., a solution of a metal, a natural or synthetic metal oxide (e.g., hydroxyapatite, $BaTiO_3$, etc.), or the like can be reduced via carbothermal reduction to provide the elemental metal. The elemental metal can then react with elemental carbon released during carbonization of the organic polymer to generate the metal carbide.

The concentration of the metal precursor can be selected so as to provide the metal of the carbide in stoichiometric balance with the carbon derived from the organic polymer. For example, the molar ratio of tungsten to carbon at the stoichiometric balance is 1 for the formation of tungsten carbide.

A carbon-source precursor can be selected based upon interaction with a pretreatment material. For example, a bacterial cellulose carbon source can be used to form a tungsten carbide cellular structure at a lower heat treatment temperature as compared to a plant-based cellulose or a starch carbon source. In addition, tungsten carbide formed via reaction with carbon from a bacterial cellulose carbon source can be of higher purity at the same heat-treatment conditions as compared to other biopolymer carbon sources. As described further herein, a tungsten carbide cellular structure derived from a bacterial cellulose starting sheet exhibited a dense and three-dimensionally interconnected nanofibril structure, which can yield high mechanical properties with better load transfer capabilities. Similarly, other organic polymer carbon sources can exhibit different interactions with other pretreatment materials, and such interactions can be utilized to further refine characteristics of produce carbon-based cellular structures as desired.

In another embodiment, a precursor can be applied to a starting sheet that, upon heat treatment, can form a plurality of metal nanoparticles on the surface of the carbon-based cellular structure. According to this embodiment, the sheet can be treated with a precursor solution. The precursor solution can include a salt of the metal of interest, e.g., a nitrate, a halide, a hydroxide or a sulfur oxide of the metal of interest.

Upon contact of the sheet with the precursor solution, metal ions of the salt can be deposited on the sheet. The metal ions can then be reduced, for instance during the heat treatment process, to form metal nanoparticles adhered to the cellular structure. The metal of the metal nanoparticles is not particularly limited, provided a cation of the metal can be held in solution and can be deposited on the sheet during the pretreatment process. By way of example, the metal can be a transition metal including, without limitation, chromium, manganese, iron, cobalt, nickel, and copper. In one embodiment, the metal can be a transition metal of the platinum group such as platinum, palladium, rhodium, ruthenium, silver, or gold.

The reduction of the metal to form the metal nanoparticles can be carried out in one embodiment by establishment of a reducing atmosphere during the heat treatment, for instance, a low oxygen atmosphere, optionally in conjunction with the addition of an actively reducing gas such as hydrogen, carbon monoxide, hydrogen sulfide, etc.

Other materials that may be deposited on the sheets, either prior to or following folding of the sheets to form the 3D precursor, can include particulates including pre-formed metal nanoparticles and other carbon allotropes such as carbon nanotubes, fullerenes, etc.

During a pretreatment process, solution or suspension including a compound of interest, e.g., an aqueous solution comprising a metal precursor, an aqueous suspension including a particulate for deposition, etc., can contact the sheet so as to infiltrate the matrix of the organic polymers with the compound of interest. For instance, a sheet can be immersed in a precursor solution or a precursor solution can contact a sheet under the force of a vacuum, which can cause the materials contained in the precursor solution to be provided throughout the depth of the sheet. Alternatively, a precursor solution can be applied at the surface of the sheet, such that a material of interest in the precursor solution, e.g., a particulate, is applied primarily at the surface of the sheet, with less of the material in the interior of the sheet.

Figure 5:
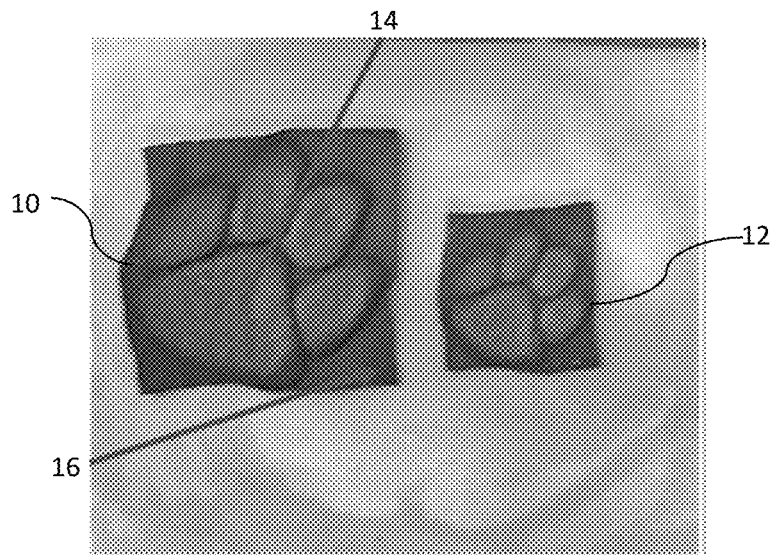
FIG. 5 illustrate two 3D cellular structures of different sizes that each include defined areas of different heat treatment product materials.
Figure 6:
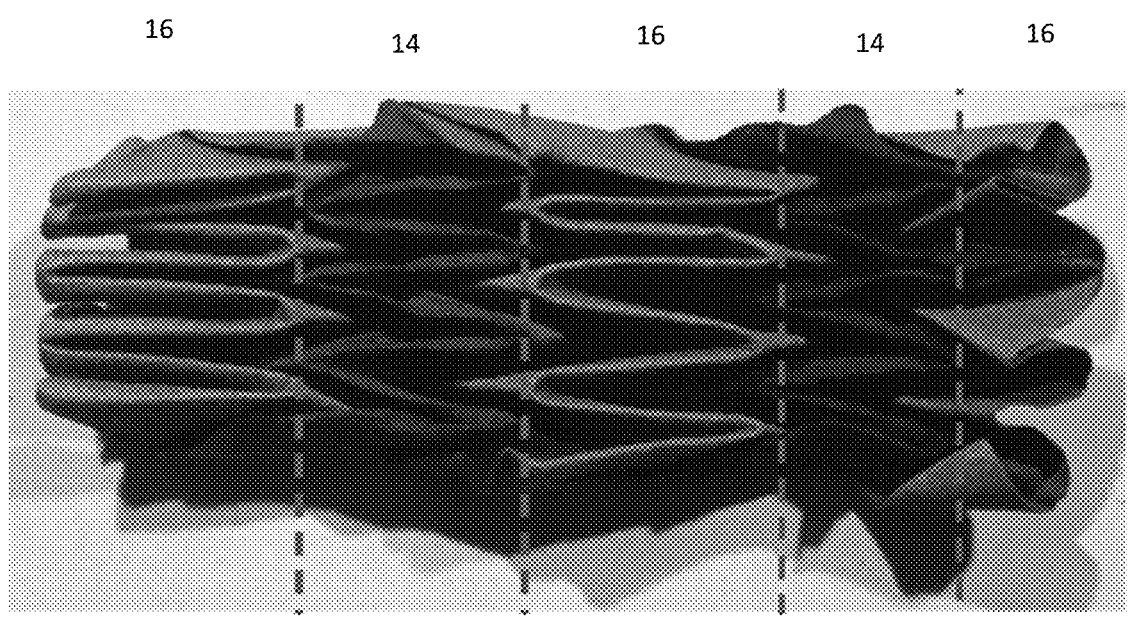
FIG. 6 illustrates a carbon-based origami shaped cellular structure including defined areas of different heat treatment product materials.

In one embodiment, a precursor solution can be applied to only a portion of a 2D sheet or a 3D precursor. In such a fashion, the carbon-based cellular product can exhibit different characteristics at different locations. For example, FIG. 5 illustrates carbon-based cellular structures 10, 12 of the same basic shape but having different sizes. The cellular structure 10 includes first areas 14 and second areas 16. Prior to heat treatment, the first areas 14 can be pretreated by application of a precursor solution to the areas, for instance via manual or automatic application (e.g., printing, lithography, etc.). Following heat treatment, the first areas 14 can include the resulting product obtained from the combined organic polymer of the sheet and the precursor solution, e.g., a metal carbide, and the second areas 16 can include the resulting product of heat treating the sheet absent the precursor solution, e.g., vitreous carbon only. FIG. 6 illustrates another example of a heterogeneous carbon-based cellular structure in which first areas 14 are formed (or primarily formed) of a first carbon-based material, e.g., vitreous carbon, and second areas 16 are formed (or primarily formed) of a second carbon-based material (e.g., a metal carbide).

Another example of a pretreatment can be a treatment that improves folding of the 2D sheet. For instance, in those embodiments in which the sheet including the organic polymer as carbon source is not easily folded, a pretreatment can include application of a pretreatment to facilitate folding and shaping of the sheet. For instance, a sheet formed of a bacterial cellulose can be difficult to fold. In one embodiment, an oil can be applied to such a sheet, which can provide the sheets with improved flexibility and facilitate folding.

In another embodiment, an essentially 2D sheet can be formed to the shape of a 3D mold during a pretreatment. Upon drying or setting, the sheet can be removed from the mold while retaining the 3D shape of the mold. Thus, the shaping of the 2D sheet can be carried out by using the mold to "fold" the sheet.

Multiple pretreatments can also be combined to provide a carbon-based cellular structure exhibiting multiple materials and characteristics in a predetermined design, so as to further control and define the characteristics of the final structure.

Following any pretreatment of the sheet, the sheet can be folded to form the shape of the 3D precursor. In one embodiment, origami-based techniques can be used to fold and shape the precursor. In origami, 3D complex architectures are fabricated from a flat piece of paper by folding the paper along prescribed creases. Origami folding techniques have potential to fabricate numerous intricate architectural shapes of engineering value. In particular, a 2D sheet can be folded by use of origami techniques to provide a lightweight and rigid cellular 3D precursor that can then be carbonized to form a tailored carbon-based cellular structure. Moreover, origami-based techniques provide excellent scalability capability to disclosed methods.

When considering cellulose-based materials, the fibers are generally derived from wood pulp and are hollow and the entanglement of the fibers results in a random distribution of open pores between the fibers. The fiber entanglement and the presence of open pores means that folding of the sheet to form the 3D precursors is relatively simple, as the open pores allow the fibers to accommodate displacement or bending of the fibers during folding, whereas the entanglement restrict the fibers from being raptured.

The method of shaping the 2D sheet is not particularly limited, and a sheet can be creased and folded according to manual methods, automated methods, or some combination thereof. For instance, in one embodiment, continuous embossing and folding techniques can be combined with a continuous heat treatment process using, e.g., robotic folding approaches combined with belt conveyor or pusher tunnel furnaces common in the production of ceramics so as to provide a high throughput production process for cellular materials of complex shapes exhibiting tightly controlled mechanical characteristics. For instance, a large scale manufacturing of carbon-based cellular structures can include embossing rollers to pre-crease the 2D sheet, automatic folding using robots and continuous heat treatment using e.g., rolling furnaces.

One exemplary origami pattern encompassed herein is the Miura-ori pattern illustrated in FIG. 1. As shown in FIG. 1, the geometry of Miura-ori resembles a herringbone pattern and consists of a series of convex "mountains" and concave "valleys." The facets 2 of the cells will form the rigid panels of the product cellular structure and the creases 4 will form the hinges. As shown, a unit cell of a structure can be defined by the design parameters h, I and $\alpha$. This particular origami tessellation has gained much attention among the engineering communities because of its simplicity and mechanical properties such as high specific stiffness, impact energy absorption, and negative Poisson's ratio. The Miura-ori pattern has been employed in different applications including packaging of solar panels for space missions and deformable energy storage devices. The pattern can be also found in nature in different forms such as leaves, embryonic intestines, and insect wings.

Figure 2:
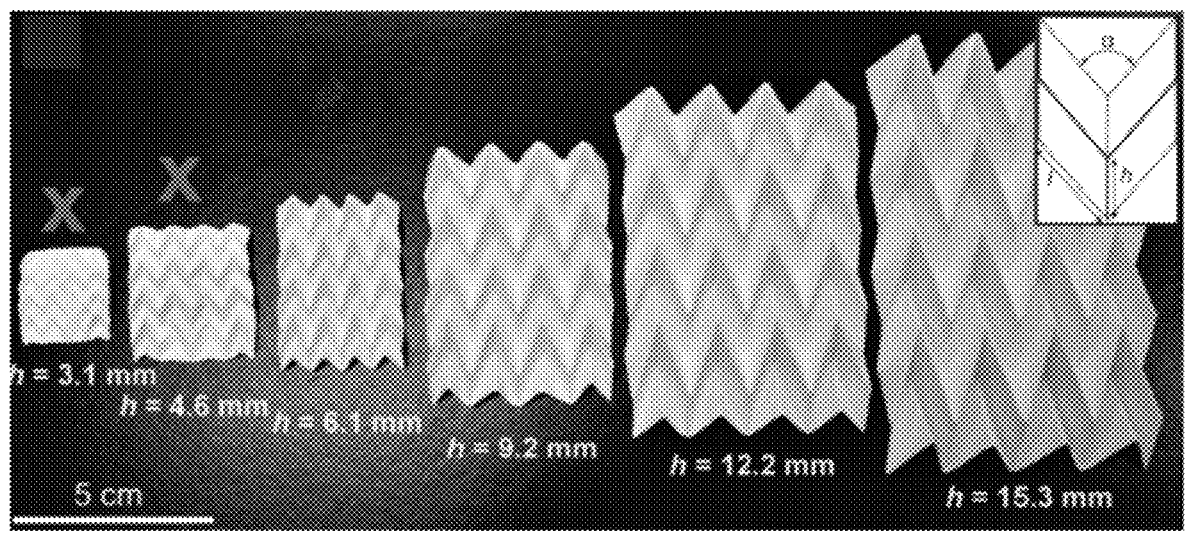
FIG. 2 illustrates several different sizes of 3D precursors, all including the same unit cell shape based on the Miura-ori origami design.

The cellular structures can be provided an any desired size, with the size being limited only by the ability to form the 3D precursors from the starting sheets. For instance, FIG. 2 illustrates several examples of the Miura-ori patterned 3D precursors formed to a variety of different sizes.

Figure 3:
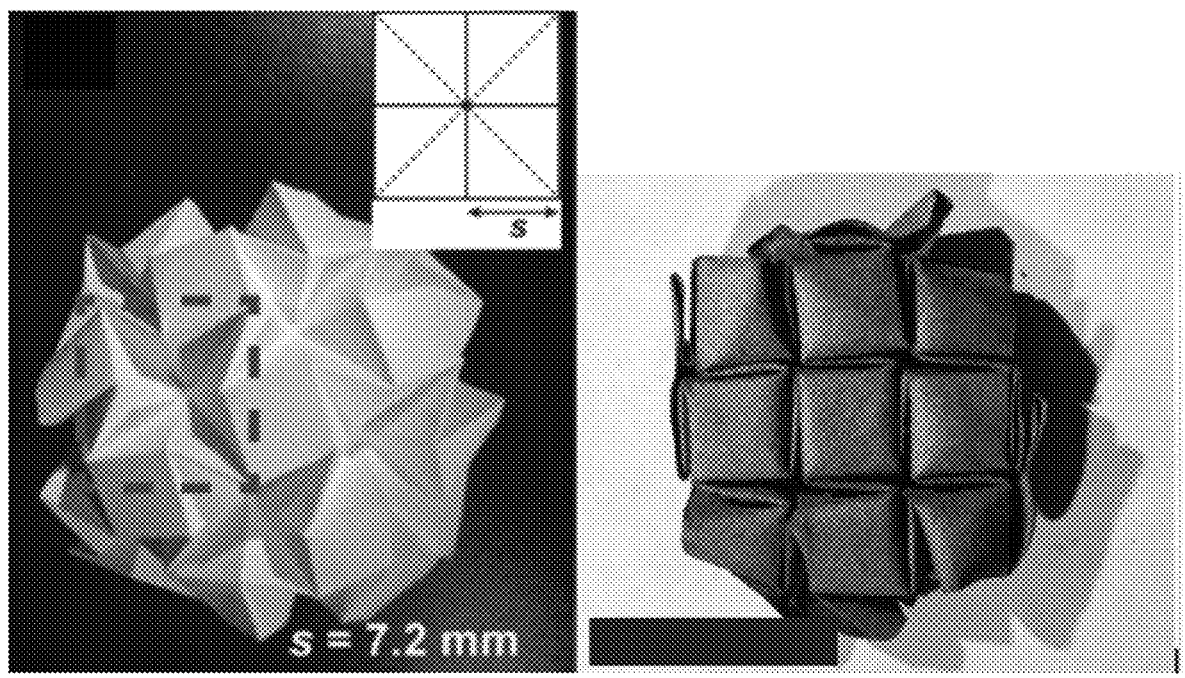
FIG. 3 illustrates another example of an origami shaped precursor (left) as may be utilized in forming a carbon-based 3D cellular structure (right).
Figure 4:
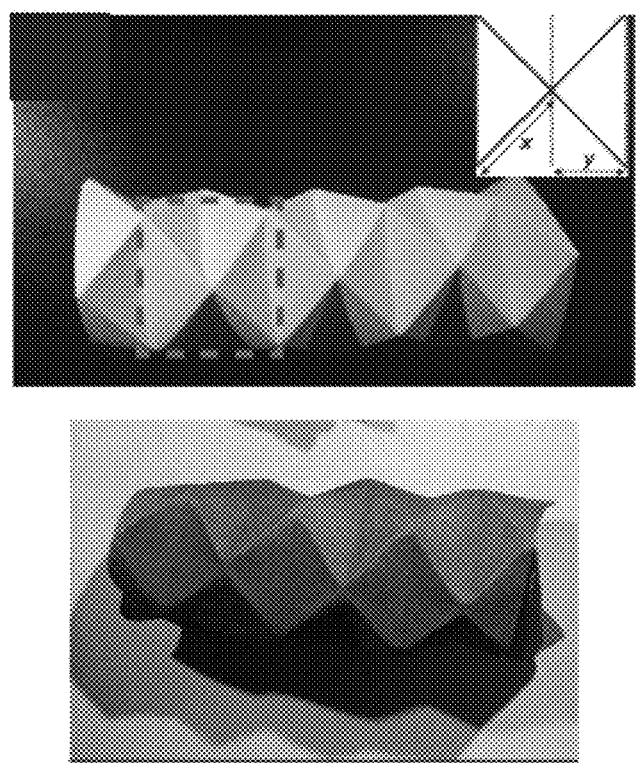
FIG. 4 illustrates another example of an origami shaped precursor (top) as may be utilized in forming a carbon-based 3D cellular structure (bottom).

Other examples of origami structures can include, without limitation, the Waterbomb base (FIG. 3) and Yoshimura (FIG. 4) origami structures. These illustrated designs featured 16 unit cells, but these and other designs are not limited to any particular cell number. The Waterbomb base unit cell can be defined by the design parameter s as shown in the inset of FIG. 3 and the Yoshimura unit cell can be defined by the design parameters x and y as shown in the inset of FIG. 4. Also shown in the figures are the final carbon-based cellular structures formed from the 3D precursors (FIG. 3, right side and FIG. 4, bottom). As shown, the structures maintain the general shape of the 3D precursor throughout the heat treatment step of the formation process.

In general, the complexity of an origami structure can be characterized by N, which is the ratio between the number of crease lines and the area of the starting sheet. Miura-ori is highly complex, with the highest N among the three examples of FIG. 1-FIG. 4, with the Waterbomb base (FIG. 3) of the next highest complexity of the three. The level of complexity means that for a given surface area of the sheet, a more complex design features more crease lines. N can thus be related to the characteristic size of the 3D precursor as given by the unit cell. For example, the unit cell of Miura-ori (FIG. 1) can be characterized by h, the unit cell of a Waterbomb base (FIG. 3) can be characterized by s, and the unit cell of a Yoshimura (FIG. 4) can be characterized by y. For a given length of h, s and y, a Miura-ori features a higher N. In general, the achievable structure depends on the 3D shape and the characteristic size of its unit cell. The minimal length of the characteristic dimension that can be used to achieve a 3D precursor shape will thus depend on the shape. For example, a value of h=4.6 mm can be too small to achieve a Miura-ori 3D precursor, a value of s=3.6 mm can be too small to achieve a Waterbomb base, and a value of y=2.1 mm can be too small to achieve a Yoshimura.

Of course, the folded 3D precursors are not limited to origami-based shapes. By way of example, FIG. 5 illustrates another example of a cellular structure that can be formed by folding an essentially 2D sheet.

The 3D precursor can be heat treated so as to carbonize the organic polymer of the precursor and, in those embodiments in which a secondary result is to be carried out (e.g., formation of a metal carbide, formation of metal nanoparticles, etc.), so as to encourage the secondary result of the process. In one embodiment, the heat treatment can be carried out at a temperature of about 800° C. or greater, for instance from about 800° C. to about 3000° C., or from about 850° C. to about 2000° C., or about 850° C. to about 1400° C. in some embodiment.

The particular temperatures to be attained during the heat treatment step can depend upon the specific characteristics desired for the final carbon-based cellular structure. For instance, in those embodiments in which the heat treatment process can carbonize the organic polymer and encourage reaction of a metal with carbon of the organic polymer, the heat treatment can be carried out at a temperature that can encourage the carbide formation reaction. In addition, the heat treatment step can be controlled so as to encourage mechanical characteristics of the final product.

By way of example, it is believed that the micro- and mesoporosity of the carbon-based structure can be modified by varying to the carbonization temperature. For instance, the use of carbonization temperatures up to about 1000° C. (e.g., from about 600° C. to about 1000° C.) can enhance material release from the precursor during carbonization and yield a product with increased micro- and meso-porosity When forming a metal carbide, the heat treatment temperature can generally be higher than those embodiments in which the heat treatment step includes only carbonization of the organic polymer.

In those embodiments in which the process includes formation of a metal carbide, the heat treatment process can include a carbothermal reduction reaction and carburization reaction with the metal. In the disclosed processes, the metal carbide formation can be carried out at lower temperatures than previously known carbide formation approaches. For instance, in the formation of tungsten carbide, the carburization can be carried out at a temperature of about 1300° C., which is much lower than previously known methods that require a processing temperature of about 2800° C. Without wishing to be bound to any particular theory, it is believed that infiltration of the metal precursor within the structure of the organic sheet can improve nucleation of metal-based particles (e.g., $WO_3$) inside the carbon matrix. The close proximity between the carbon and the particles is believed to accelerate the carbide reaction mechanism, yielding a lower required carburization temperature. Lower carburization temperature signifies lower energy consumption, which can improve energy efficiency as compared to the traditional carbide synthesis processes.

Selection of the heat treatment temperature can also affect the formation of different carbon allotropes and the mechanical characteristics of the carbon-based cellular structures. For instance, At the interface of crystalline phase materials (e.g., a metal carbide or a metal) and carbon, the carbon can locally transform from a vitreous carbon to graphitic phases with increasing temperature. As the local graphitization can increase with increasing temperature, failure at a lower stress can be expected at a higher processing temperature. As such, the overall mechanical properties of a product cellular structure can exhibit an inversely proportional relation with the temperature of the heat treatment step. Accordingly, in some embodiments, it may be preferred to carry out the carbonization process at a lower temperature, so as to improve certain desirable mechanical properties. However, a lower heat treatment process can also decrease conversion of a precursor to a desired secondary product (e.g., a metal carbide or metal nanoparticles. Such trade-offs between material formation and mechanical characteristics are known in the art and can be evaluated on a case-by-case basis.

The heat treatment temperature can also vary depending upon the nature of the carbon source. For instance, and as described in further detail below, metal carbide synthesis temperature for a system utilizing a bacterial cellulose carbon source can be about 1200° C., whereas formation of the same metal carbide utilizing a plant based carbon source and a starch carbon source was about 1300° C. Without wishing to be bound to any particular theory, it is believed that the higher crystallinity of bacterial cellulose-derived carbon can accelerate the carburization process to yield a lower temperature synthesis of the metal carbide.

Other aspects of the heat treatment process can be selected so as to provide the desired products. For instance, as discussed previously, the heat treatment step can be carried out in one embodiment in a reducing atmosphere (e.g., in argon) to reduce a metal oxide and form metal nanoparticles from a precursor. In another embodiment, a heat treatment process can be carried out in a nitrogen atmosphere, which can encourage reaction between the nitrogen and a metal of a precursor to form a metal nitride component in/on the product cellular structure.

Thus the presence of precursors, fillers, etc. in the 3D precursor, combined with conditions of the heat treatment step, can be used to form carbon-based materials (e.g., carbides) that are a component of a two-phase product. In some embodiments, all of the carbon of the carbon source can completely react during the heat treatment such that the entire product is formed of the reaction product, e.g., a metal carbide, with little or no unreacted carbon remaining in the cellular structure.

Following the heat treatment step, a process can include further processing, as desired. For instance, in one embodiment, a metal carbide of a cellular structure can be oxidized (e.g., via heat treatment at about 900° C. in an oxygen-rich atmosphere) to form a metal oxide The carbon allotrope of a product cellular structure can be primarily amorphous nature. For instance, in one embodiment, a carbon cellular structure can include about 90% or more by weight vitreous carbon, e.g., about 95% or more or pure vitreous carbon in some embodiments. However, the products can also include graphitic phases in conjunction with an amorphous phase. For instance, a carbon structure derived from bacterial cellulose can include relatively higher graphitic phase as compared to that obtained from plant-based cellulose or that of a starch-based precursor.

Cellular materials based on origami structures described herein can exhibit a relative stiffness comparable to carbon nanotube foams, graphene elastomers, metallic micro-lattices, carbon foams, and silica aerogel. For instance, in one embodiment, vitreous carbon cellular materials as described can exhibit a structural density from about 0.9% to about 2% of the density of bulk vitreous carbon (e.g., from about 1.3 $g/cm^3$ to about 1.5 $g/cm^3$ in one embodiment. By way of example, vitreous carbon cellular materials as described herein can exhibit a compressive strength ($e_m$) ranging from about 4 kPa for a material having a structural density (p) of about 0.01 $g/cm^3$ to about 16 kPa for a material having p of about 0.04 $g/cm^3$ (e.g., having a compressive strength of from about 2 kPa to about 20 kPa and a structural density of from about 0.01 $g/cm^3$ to about). In one embodiment, a vitreous carbon cellular material as described can exhibit an elastic modulus (E) of from about 50 kPa for a material with p of about 0.014 $g/cm^3$ to about 190 kPa or greater (e.g., from about 50 kPa to about 200 kPa) for a material with p of about 0.03 g/cm³. In comparison, the average compressive strength of bulk vitreous carbon is in the range 300-700 MPa.

However, it should be understood that disclosed materials are not limited to these mechanical characteristics. In particular, and as described further herein, in the disclosed materials mechanical characteristics such as $\sigma_m$ and E have been found to be related (e.g., inversely proportional) to the design parameters of the individual cells of the shaped precursors, and as a result, disclosed materials can be designed to exhibit tailored mechanical characteristics through selection of the size and shape of the cells of the precursor. Moreover, the mechanical properties of the carbon-based cellular materials can be further controlled by tailoring the microstructure of the precursor paper via, e.g., selection of cellulose type, sheet porosity, weight, presence/amount of secondary sheet components, etc.

For instance, a carbon-based cellular structure formed herein that includes a metal carbide as all or a portion of the structure can exhibit a compressive strength of from about 10 kPa to about 50 kPa, or even higher, a structural density of from about 0.04 g/cm³ to about 0.1 g/cm³, and an elastic modulus of from about 10 kPa to about 50 kPa.

Cellular materials, including stochastic foams, can be characterized by the dependence on density of elastic modulus given by the following equation:

$$E \propto E_s \left(\frac{\rho}{\rho_s}\right)^n$$

Where Es and $\rho_s$ are the elastic modulus and the density of the solid respectively, and n is an exponent that represents the mode of deformation, e.g. bending or stretching. The value of the constant n depends on the microstructure of the material as well as the structural geometry which includes the cell type (open or closed), the geometrical arrangement of the cells and the size of the cells. Values of n beyond 2 represent rapid loss of interesting properties as density increases and signify inefficient load transfer between the ligaments of the cellular structure. Values of n less than 2 signify better load transfer capability through the structure ligaments. A n=1 denotes a stretch dominated structure, which exhibits higher compressive strength and stiffness in comparison to bending-dominant structures (n=2).

In one embodiment, cellular structures described herein can have an n of close to 2, e.g., from about 1.7 to about 2.This suggests a bending-dominant mechanical behavior similar to open cell cellular materials. This is not surprising for fibrous structures, due to the random collection of fibers in the facets. Furthermore, many origami shapes and Miura-ori in particular do not feature any strut at the basal plane, which is a characteristic for stretch-dominated micro-lattices. A n is this range also means that the structure can exhibit better scaling and better load transferring capability than other cellular materials with higher values of n. For example, silica aerogel and carbon nanotube foams used for catalysts supports and energy storage applications respectively feature n of about 3. Carbon aerogels derived through carbonization of resorcinol-formaldehyde aerogel at 1100° C. feature n=2.7 at a porosity ranging from 80% to 95%, and metallic microlattices feature n=2.4, while graphene foams display n=2.5.Hence, the carbon structures presented here compare advantageously to other common lightweight cellular materials in terms of scaling and load transfer capabilities.

During heat treatment, the 3D precursors can shrink as the carbon-based cellular structure is formed. This shrinkage explains the decreasing density of the carbon-based structures as the characteristic length (e.g., h for Miura-ori) increases. An increasing value of the characteristic length means that the size of the panels of the structure increases. This effectively decreases the density of the structure by introducing larger voids in the structure. Furthermore, shrinkage during carbonization results in retraction of the panels towards each other, caused by the reduction of the folding angle as the characteristic length decreases.

Shrinkage of a structure during carbonization in the macro-scale depends on the dynamics of the 3D shape. The carbon structures feature low density, comparable to other materials such as CNT foams and graphene elastomer that require more complex fabrication processes. The disclosed cellular structures display a bending dominant failure under compression, as described previously. The carbon structures also exhibit low compressive strength and elastic modulus due to the random and wide distribution of the open pores. However, they can feature better scaling of relative stiffness when compared to other cellular engineering materials such as silica aerogel, carbon aerogel, graphene elastomers, metallic micro-lattices and CNT foams. This indicates better load transfer capability of the carbon-based cellular structures when compared to other cellular engineering materials.

The carbon-based cellular structures can be used as is or can be further treated via post-processing. For instance, in one embodiment, the cellular structures can be used as scaffolds for composite materials. According to this embodiment, a cellular structure can be infiltrated with a secondary material, e.g., a polymer, a ceramic, a metal, etc. and can improve mechanical characteristics of the secondary material alone. For instance, disclosed cellular structures can serve as a reinforcement material in a composite structure including a reinforcing cellular structure surrounded by a secondary polymeric or ceramic material.

A polymeric composition can be applied to a structure from a melt or solution and likewise, a ceramic precursor can be applied to a structure such that the cellular structure is encapsulated with the secondary material. Upon setting (e.g., cooling, evaporative setting, crosslinking, heat treatment, etc.) of the secondary material, the composite can have included the 3D shape of the carbon-based cellular structure and the desirable characteristics of the combined materials of the composite.

The present disclosure may be better understood with reference to the Examples set forth below.

EXAMPLE 1

A cellular sheet of vitreous carbon was formed according to described processes. The fabrication process included four steps illustrated in FIG. 1 including the design of an individual cell (a), design of the crease pattern for a sheet including a plurality of the cells, with FIG. 1 at (b) and (c) showing each side of the paper. At (d) is shown an image of a sheet following automatic pre-creasing and at (e) is shown the three dimensional precursor sheet following manual folding. FIG. 1 at (f) shows the cellular material following carbonization.

Pure cellulose chromatography paper (Fisherbrand Chromatography Paper, Cat. No. 05-714-1) with thickness of 0.19 mm or 0.34 mm (Whatman 3 MM Chromatography paper, Cat. No. 3030-6158) were used. This example focused on the Miura-ori pattern of FIG. 1 that belongs to the family of rigid origami.

The crease pattern for a unit cell of the Miura-ori fold is shown in FIG. 1 at (a). The dotted and solid lines in the image represent the creases to create "valleys" on one side of the paper and "mountains" on the other. The Miura-ori design used featured 16 unit cells. The unit cell design parameters h, l and a are shown in FIG. 1. The Miura-ori designs on the 2D sheet featured an a of 75° and a ratio between h and l of 3:5. The value of h was varied in different samples from 3.1 mm (⅛ in) to 15.3 mm (⅝ in) as the size of the sheets increased from 1 inch×1 inch to 5 inch×5 inch (FIG. 2).

Individual crease patterns for "valleys" and "mountains" for all structures were designed using Solidworks (Dassault Systems, Waltham, Mass., USA). The design files enabled automatic pre-creasing of the precursor sheets.

A modified desktop cutting-plotter machine (Graphtec CE6000-40, Japan) was used to automatically pre-crease the paper and facilitate folding. The cutting blade was replaced with an empty, generic ballpoint pen with a ball diameter of 1.5 mm. Parameters of interest during pre-creasing included speed of movement, acceleration, number of passes and pressing force of the pen. A speed of 12 cm/s, acceleration of 0.71 m/s$^2$, a force of 2.16 N, and three passes were parameters used to achieve the creasing and facilitate folding of the origami tessellation. An example of the pre-creased paper for Miura-ori is shown in FIG. 1 at (d). Alignment of valleys and mountains was implemented using marks that were automatically generated by the software of the cutting plotter and printed on the paper. Pre-creased samples with any visible misalignment were discarded.

Folding was done manually. An example of the folded paper Miura-ori is illustrated in FIG. 1 at (e). As indicated in FIG. 1, the angle obtained after folding, $\alpha°$, was smaller than the original of the flat sheet. Specifically, designed angle $\alpha$ of 75° was decreased after folding to 43.75°±0.33°. Five paper Miura-ori were folded for each value of design parameter h (FIG. 2).

Once folded, the precursors were heat treated. Due to a limitation on the size of the heating tube, the maximum dimension of the samples was 115 mm. The carbonization protocol included: (1) heating from room temperature to 300° C. at 5° C./min; (2) dwell at 300° C. for 30 min to allow excess oxygen to escape the furnace; (3) heating from 300° C. to 900° C. at 5° C./min; (4) dwell at 900° C. for 75 min to carbonize the cellulose of the precursor; and (5) cooling down to room temperature at a cooling rate of 5° C./min. The heat treatment was carried out under a nitrogen atmosphere. An example of a resultant carbon Miura-ori is shown in FIG. 1 at (f). Shrinkage occurred, which yielded a sharper folding angle, $\alpha"$, when compared to the angle $\alpha°$ present after folding and before carbonization.

The carbon Miura-ori structure was characterized using X-ray diffraction (XRD, Rigaku Ultima IV, Japan) spectroscopy to determine its crystallographic structure. Thermogravimetric analysis (TGA) was performed to characterize weight loss during carbonization. The microstructures of both the precursor paper and the resultant carbon cellular material were examined using scanning electron microscopy (SEM, S4800, Hitachi, Japan). A thin carbon film (10 nm) was sputtered on the precursor paper to facilitate imaging. The microstructure of the carbonized paper was further analyzed by high resolution transmission electron microscopy (HRTEM, H9500, Hitachi, Japan). The pore size distribution of the carbonized product was characterized by image analysis of the SEM images using the particle analyzer, an inbuilt macro in the ImageJ software.

The structural density ($\rho$) was determined by the envelope method, which is the ratio between the mass of each structure and the total volume it occupied. The compression tests were performed at a rate of 1 mm/min to 80% strain using an Instron Single Column Testing System (Model 5944). A load cell of 50 N was used for the compression tests. The stress-strain curve obtained in the compression test had three distinct regions: the elastic region, post-yielding softening and densification. The compressive strength ($\sigma_m$) was calculated as the onset point of fracturing of the panels, and the elastic modulus (E) as the slope of the elastic region of the stress-strain curve. This elastic region is characterized by the fact that the panels can stretch away from the creases to absorb the compression force.

Figure 7:
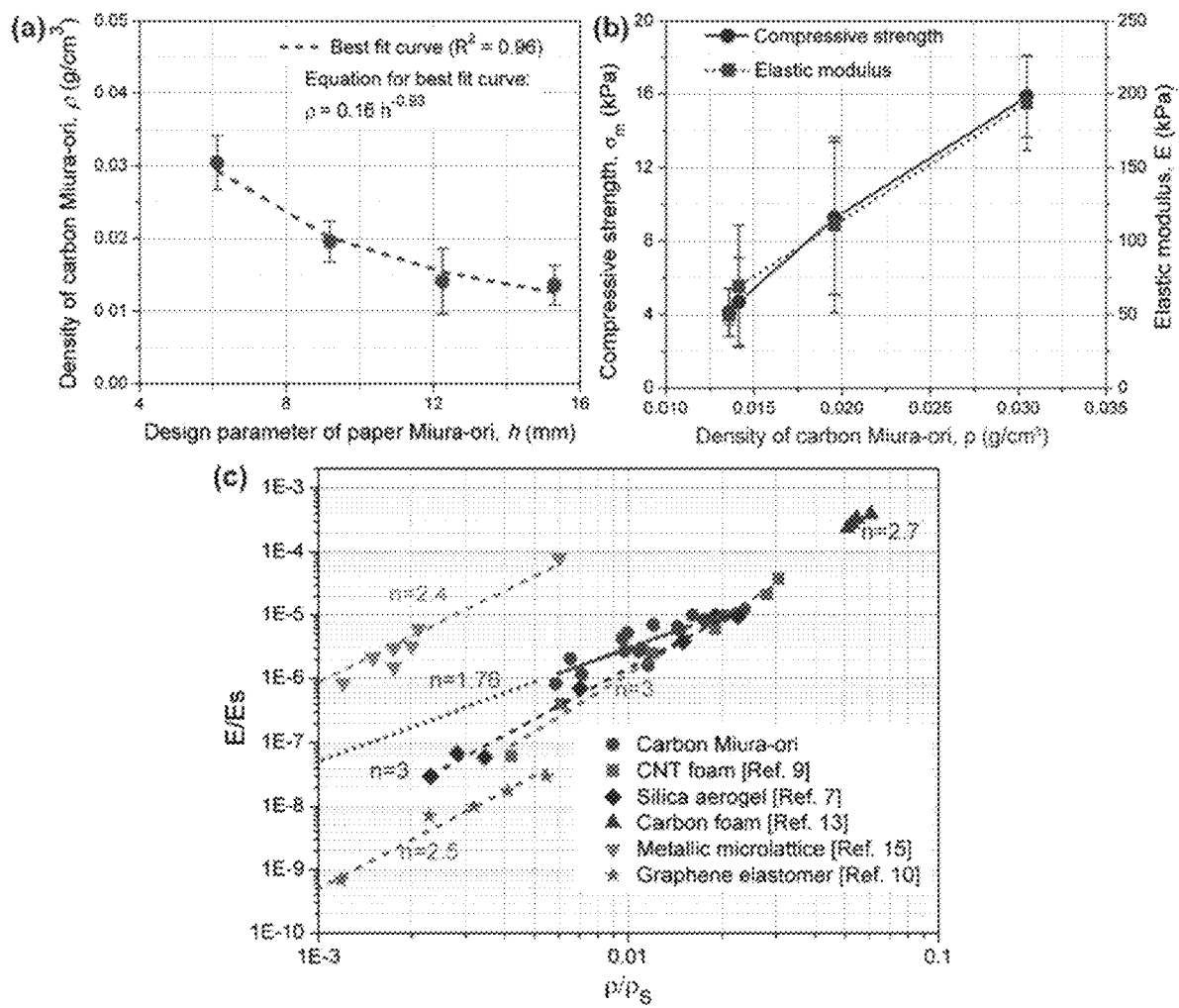
FIG. 7 includes (a) density ($\rho$) determined for carbonized structures of different sizes; (b) compressive strength ($\sigma_m$) and elastic modulus (E) graphed against density of the carbon structures; (c) Relative elastic modulus (E/Es) of carbon structures with comparison to other low-density materials.

The structural density ($\rho$) of different carbon structures is plotted in FIG. 7 at (a) for different lengths of the characteristic dimension h. At least five carbonized structures were characterized for the shrinkage and the density for each value of h tested. The error bars represent the standard deviation in the measurement. The dashed line represents the best fitted curve to the density. As shown, the density decreased from 0.03±0.004 to 0.014±0.005 g/cm$^3$ as h increased from 6.12 mm to 12.24 mm. An h of 6.12 mm was the smallest dimension that could be fabricated due to laboratory limitations (hence the X's on the smaller of the two samples of FIG. 2). The density of the structures as measured with the envelope method showed strong dependence on the length of h and hence size of the panel. This suggested that deformation of the structure during shrinkage and possibly elimination of byproducts during carbonization played an important role on the density of the carbon structures. The structural density of the carbon structures ranged from 0.93% to 2% of the density of bulk glass-like carbon (about 1.3 to about 1.5 g/cm$^3$).

The results from the characterization of $\sigma_m$ and E are shown in FIG. 7 at (b). As shown, $\sigma_m$ and E increased with the increase in density of the carbon structure. The value for $\sigma_m$ increased from 4.12±1.29 kPa for $\rho$=0.014 g/cm$^3$ to 15.85±2.21 kPa for $\rho$=0.03 g/cm$^3$. The value of E increased from 49.37±6.24 kPa for $\rho$=0.014 g/cm$^3$ to 193.83±32.17 kPa for $\rho$=0.03 g/cm$^3$. Hence, $\sigma_m$ and E were inversely proportional to the design parameter h. In comparison, the average compressive strength of bulk glass-like carbon is in the range of about 300 MPa-700 MPa.

Figure 8:
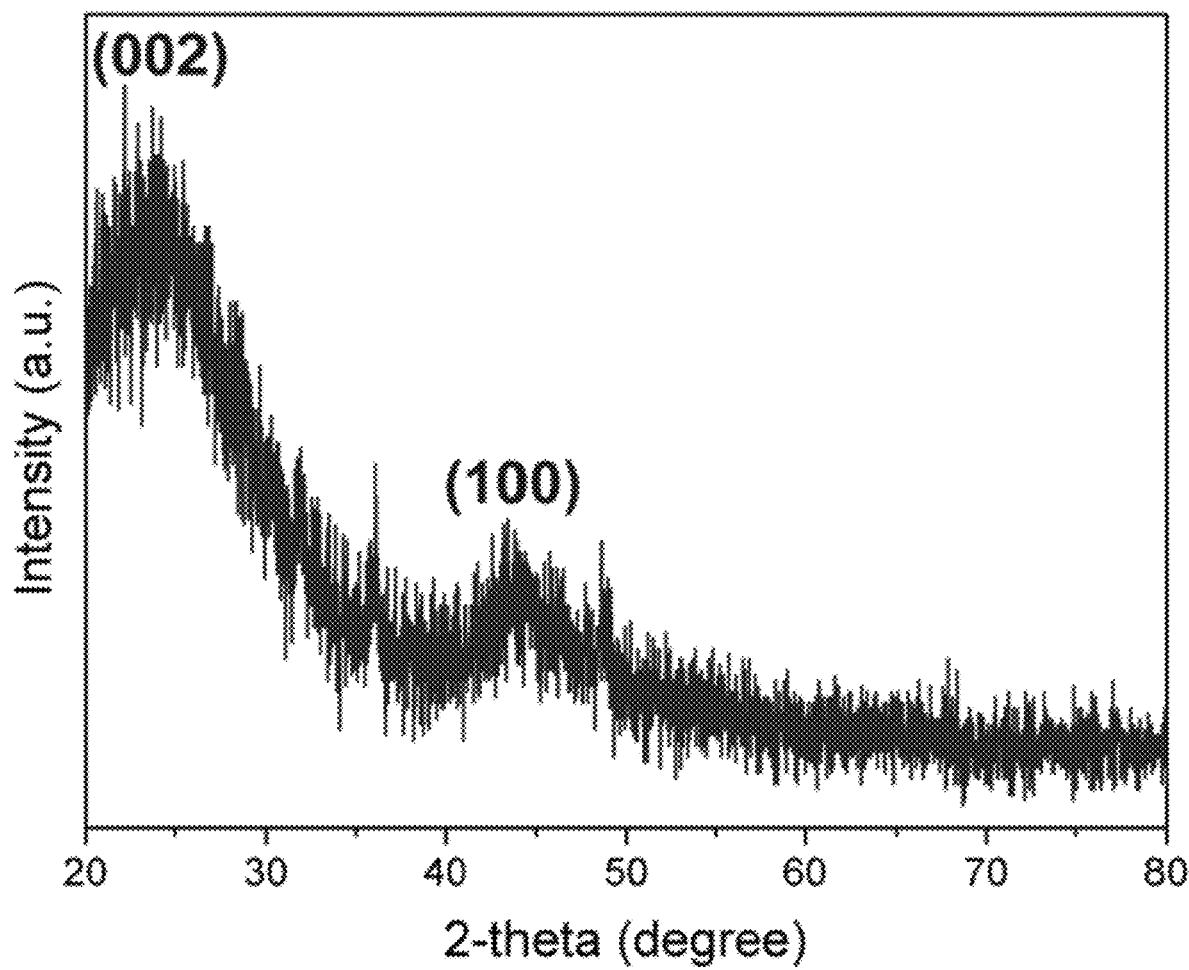
FIG. 8 presents X-ray diffraction (XRD) results of carbonized structures formed as described herein.

The results from the XRD characterization of the carbonized structures (FIG. 8) show weak and broad peaks centered around 2Θ=24° and 2Θ=43°, which are the characteristics of (002) and (100) reflections of amorphous carbon.

Figure 9:
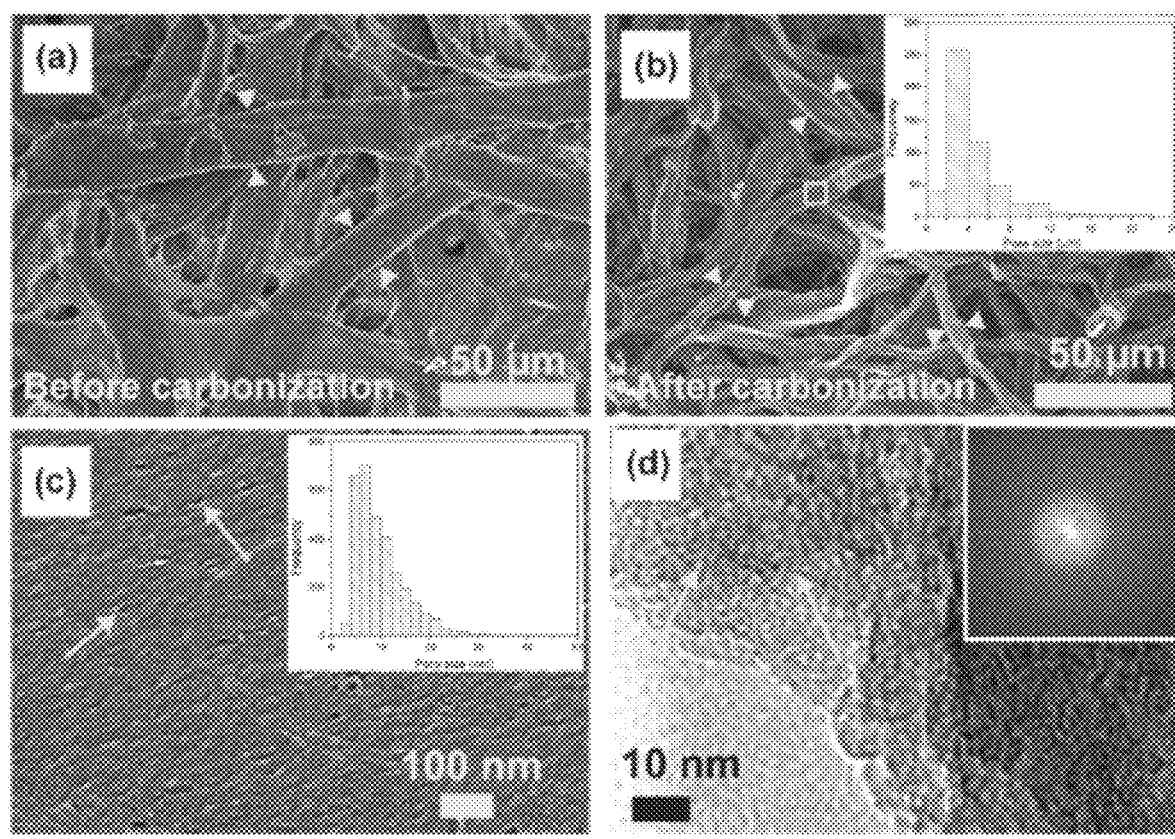
FIG. 9 presents Field Emission Scanning Electron Microscope (FESEM) images of chromatography paper used in forming precursors. Images include (a) before and (b) after carbonization at a magnification of 600×. Inset of (b) represents the pore size distribution of the open pores. At (c) is presented high magnification FESEM image of the carbonized chromatography paper at a magnification of 120k showing the mesoporous structure of the carbon fibers. At (d) is presented high-resolution transmission electron microscopy (HRTEM) image of the carbonized chromatography paper showing the micropores in the carbon material.

The chromatography paper used in forming the structures was basically a collection of tightly packed cellulose fibers as shown in FIG. 9 at (a). The average diameter of the fibers was 17.48±3.06 mm. The carbonized product obtained after heat treatment is shown in FIG. 9 at (b). The arrows in the figures indicate the diameter of the fibers. Diameters were measured for at least ten fibers in both cases. No impurities were observed on the carbon matrix. This was in contrast to significant impurities reported when carbonizing other paper types which are not marketed as pure cellulose. Following carbonization, the fibers shrank to an average diameter of 5.26±2.53 mm, resulting in an average linear shrinkage of fiber diameter of 69.89±5.59%. The spacing between fibers was of random nature leading to macro-porosity of varying dimensions in the range from 1.56 mm to 21.71 mm (inset of FIG. 9(b)).

The carbon fibers themselves displayed a wide range of open pore sizes. SEM analysis at magnification of 120k revealed a mesoporous structure with pore diameter ranging from 3.15 nm to 44.78 nm (FIG. 9 at (c)). Examples of the pores are indicated by the arrows. TEM studies at magnification up to 500k further suggested presence of micropores (pore diameter less than about 2 nm) within the fibers (FIG. 9 at (d)). The electron diffraction pattern in the inset shows no ring or spot, which confirms the amorphous nature of the carbon sample. At the presented scale, it was difficult to identify and measure the size of the micropores. The hypothesis was that the escape of gaseous substances during carbonization caused the micropores in the carbon material and the compact aggregation of the material resulted in the mesoporous structure. The micro- and meso-pores also contributed to the microstructure and mechanical properties of the carbon structures. With increased micro- and meso-pores, the carbon fibers became less dense resulting in a decrease in $\sigma_m$ and E.

Figure 10:
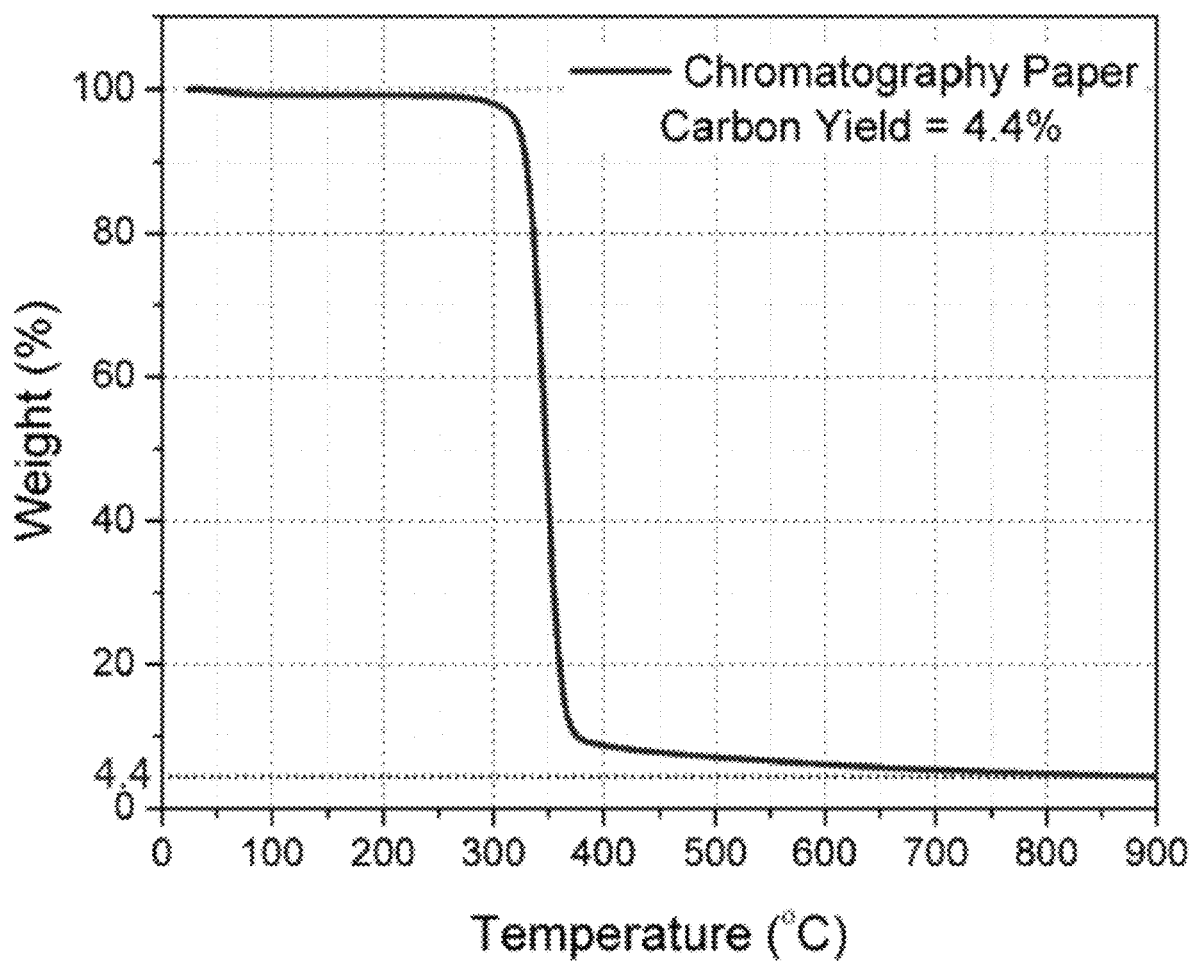
FIG. 10 presents thermal gravimetric analysis (TGA) of chromatography paper with a heating rate of 5° C./min in nitrogen at atmospheric pressure.

Thermogravimetric analysis (TGA) was performed to calculate the carbon yield of the precursor. The results from the TGA are shown in FIG. 10. A sharp weight loss occurred between 300° C. and 380° C., which was attributed to the thermal decomposition of cellulose in the form of volatile components such as levoglucosan, hydroxyacetaldehyde, acetol, CO and $CO_2$. Above 380° C., a gradual weight loss at approximately 0.0097%/° C. could be observed which was mainly caused by elimination of oxygen and hydrogen in the form of CO, $CO_2$ and hydrocarbons ($C_xH_y$). The carbon yield at 900° C. was 4.4%.

Figure 11:
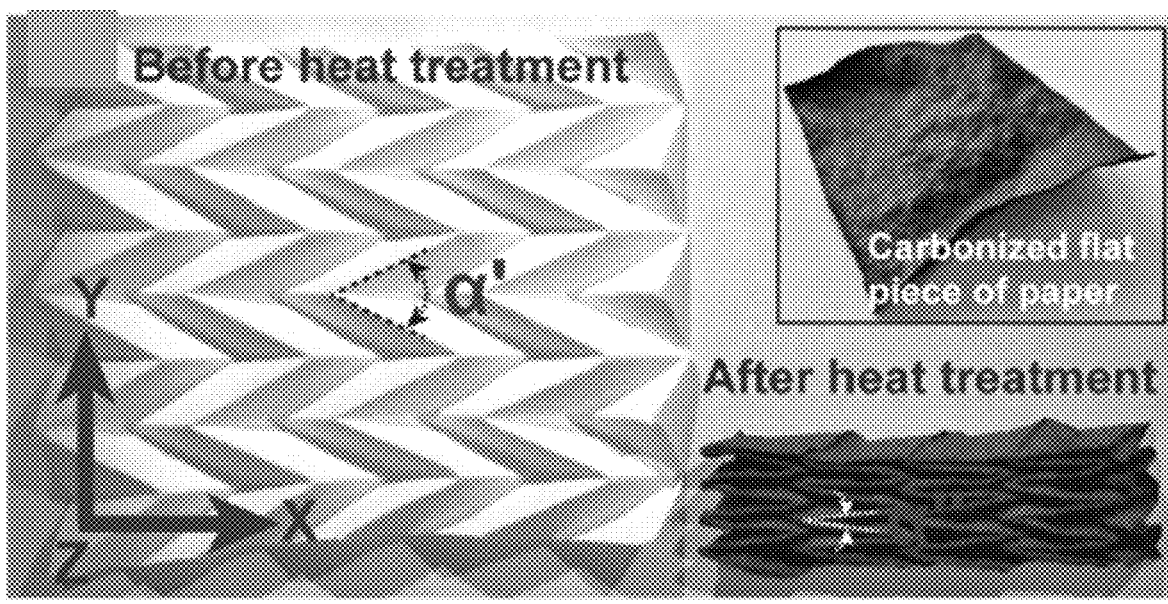
FIG. 11 illustrates shrinkage of a sheet before (left) and after (right) carbonization and compares shape modification of a precursor upon carbonization to that of a flat precursor sheet (inset).
Figure 12:
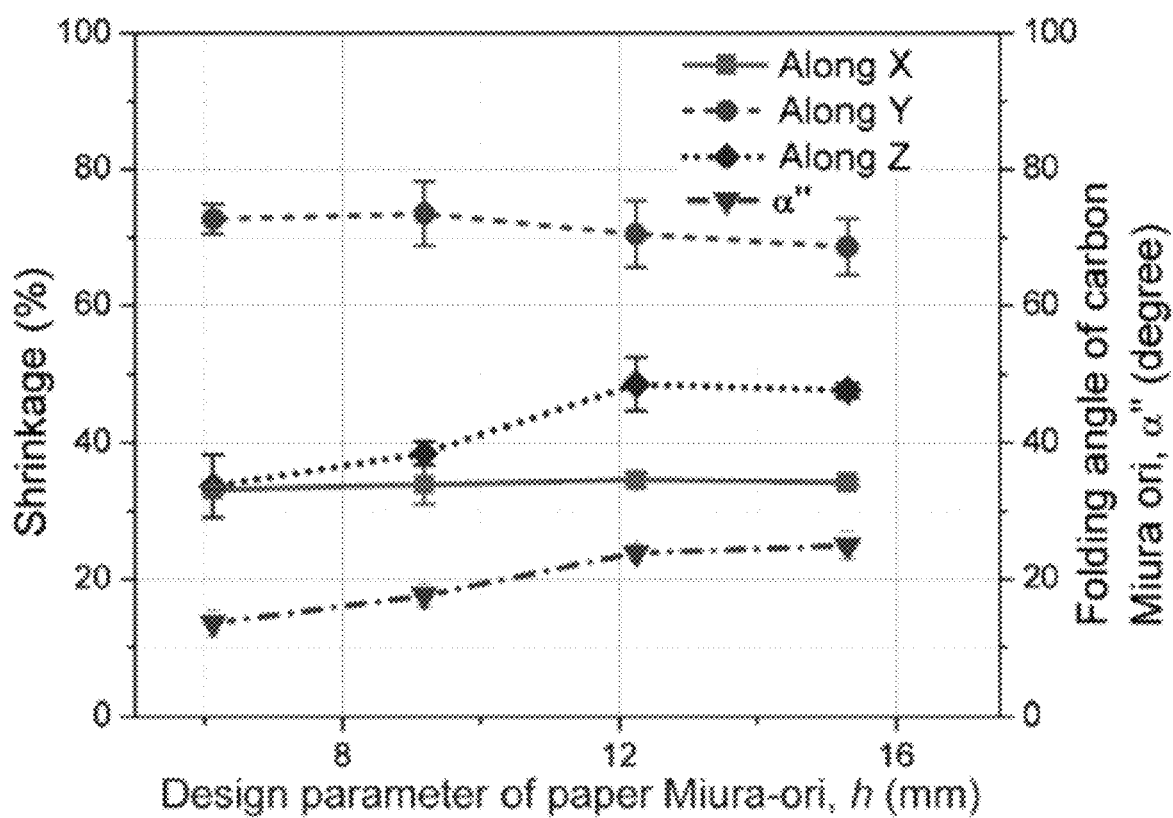
FIG. 12 graphically illustrates the shrinkage upon carbonization for different cellular materials formed as described herein.

The structural shrinkage of the carbon structure was the result of formation process effects at various length scales from the micrometric fibers to centimetric precursors as a whole. As a reference, the carbonization of a flat piece of cellulose paper with no folding was carried out, resulting in a curved carbon film (insert in FIG. 11). As shown, a 3D precursor formed from a flat sheet of the same paper and the same dimensions did not curve during carbonization (FIG. 11). The hypothesis is that the dynamics of the 3D structure facilitated the release of thermal stress and thermal contraction through shrinkage, which prevented the precursor from curving during carbonization. Interestingly, the amount of shrinkage in different axes of the shaped precursor was different as shown in FIG. 11. Shrinkage was calculated using Equation (2), $$\text{Shrinkage \%} = \frac{L_{Pi} - L_{Ci}}{L_{Pi}}$$

in which $L_{Pi}$ and $L_{Ci}$ are the dimensions of the precursor and the carbonized product, respectively, in the i-axis. Most of the shrinkage occurred in the horizontal plane and in the direction perpendicular to the characteristic dimension h. This direction was denoted as the Y-axis. The least shrinkage occurred in the X-axis, or the direction parallel to h. The shrinkage in X with respect to h was constant, slightly variable in the case of the Y-axis and significantly different for the Z-axis. The dynamics of the structure are likely to play a role in shrinkage. For instance, it is known that a Miura-ori structure offers the least mechanical resistance in the Y-axis, followed by the Z-axis and lastly the X-axis. The shrinkage reported here follows this trend in all samples (FIG. 12).

In order to assess the effect of the thickness of the precursor paper, the dimensions of starting sheets having thickness 0.19 mm or 0.34 mm and those of the resultant Miura-ori carbonized products were compared. The dimensions of the papers were similar, and the amount of shrinkage during carbonization remained the same in all directions regardless of the paper thickness (data not shown). Since both papers featured similar pure cellulose fibers and fiber density, the hypothesis was that the fibers experienced similar material loss and thermal contraction force during the heat treatment irrespective of the paper thickness.

EXAMPLE 2

Pure cellulose chromatography paper (Fisherbrand Chromatography Paper, Sigma Aldrich, Cat. No. 05-714-1) with a thickness of 0.19 mm was used as the 2D sheets. Ammonium metatungstate (AMT, Sigma Aldrich, Cat. No. 463922) was used as the tungsten precursor for WC synthesis. Ultra-pure water was used as the solvent of the AMT solution used to infiltrate the paper.

The fabrication of WC Miura-ori included five steps: 1) design of crease pattern, 2) automatic pre-creasing, 3) infiltration of AMT, 4) manual folding and 5) heat treatment. The crease patterns were designed, and the 3D precursors were shaped as described in Example 1. Prior to the folding step, the 2D sheet was infiltrated with AMT after pre-creasing using an aqueous solution of AMT with varying concentrations for different sampel runs (wt/vol. %). Each sample of pre-creased paper was immersed in the AMT solution for 20 minutes. The samples were then dried on a hot plate at 85° C. for 1 hour to enable manual folding.

Figure 13:
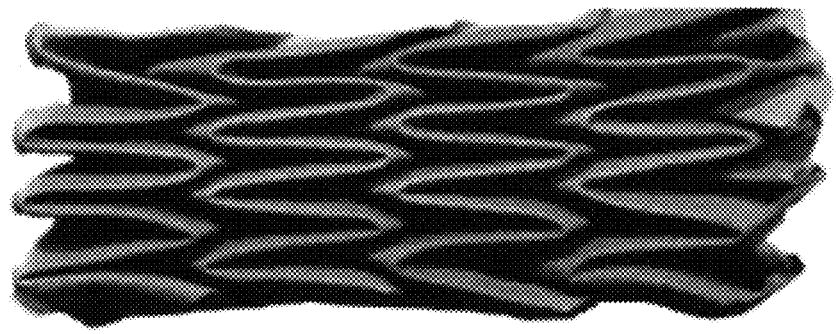
FIG. 13 illustrates a tungsten carbide (WC) cellular material formed as described herein.

Once folded, the precursor structures were heat treated in a tube furnace (TF1700, Across International, USA). The heat treatement protocol featured 5 steps: (1) heating from room temperature to 300° C. at 5° C./min; (2) dwell at 300° C. for 30 min to allow the excess oxygen to escape the furnace; (3) heating from 300° C. to an elevated temperature; (4) dwell at this temperature for 3 hours; and (5) cooling down to room temperature at a cooling rate of 5° C./min. Different final temperatures and heating rate were used in step (3) for different sample runs. The dwell time in step (4) was kept constant at 3 hours. The entire heat treatment process was performed under a vacuum atmosphere since AMT contains a highly stable form of $WO_3$ that requires higher energy to break the stable W—O bond. An example of the resultant tungsten carbide Miura-ori after heat-treatment is shown in FIG. 13.

All samples obtained after heat treatment were characterized via XRD, SEM, HRTEM as described previously. Elemental analysis of selected samples was performed using energy-dispersive X-ray spectroscopy (EDS, Oxford Instruments, US) mounted on a scanning electron microscope (SU6600, Hitachi, Japan). The pore size distribution was characterized by image analysis of the SEM images using the Particle Analyzer macro built into the ImageJ software. The grain size of crystalline materials present in the heat treated samples was estimated from the XRD patterns using the Scherrer Equation (below), in which the average grain size (D) is estimated using the wavelength of X-ray ($\lambda$), the Bragg angle ($\theta$), the half width of the diffraction peak (B) and a constant k, which is generally taken as 1.

$$D = \frac{k\lambda}{B\cos\theta}$$

The structural density (p) of the products was calculated by the envelope method. Compressive tests were performed on the heat treated samples to characterize the compressive strength ($\sigma_m$) and the elastic modulus (E) of the samples. The compressive tests were performed as described above.

Figure 14:
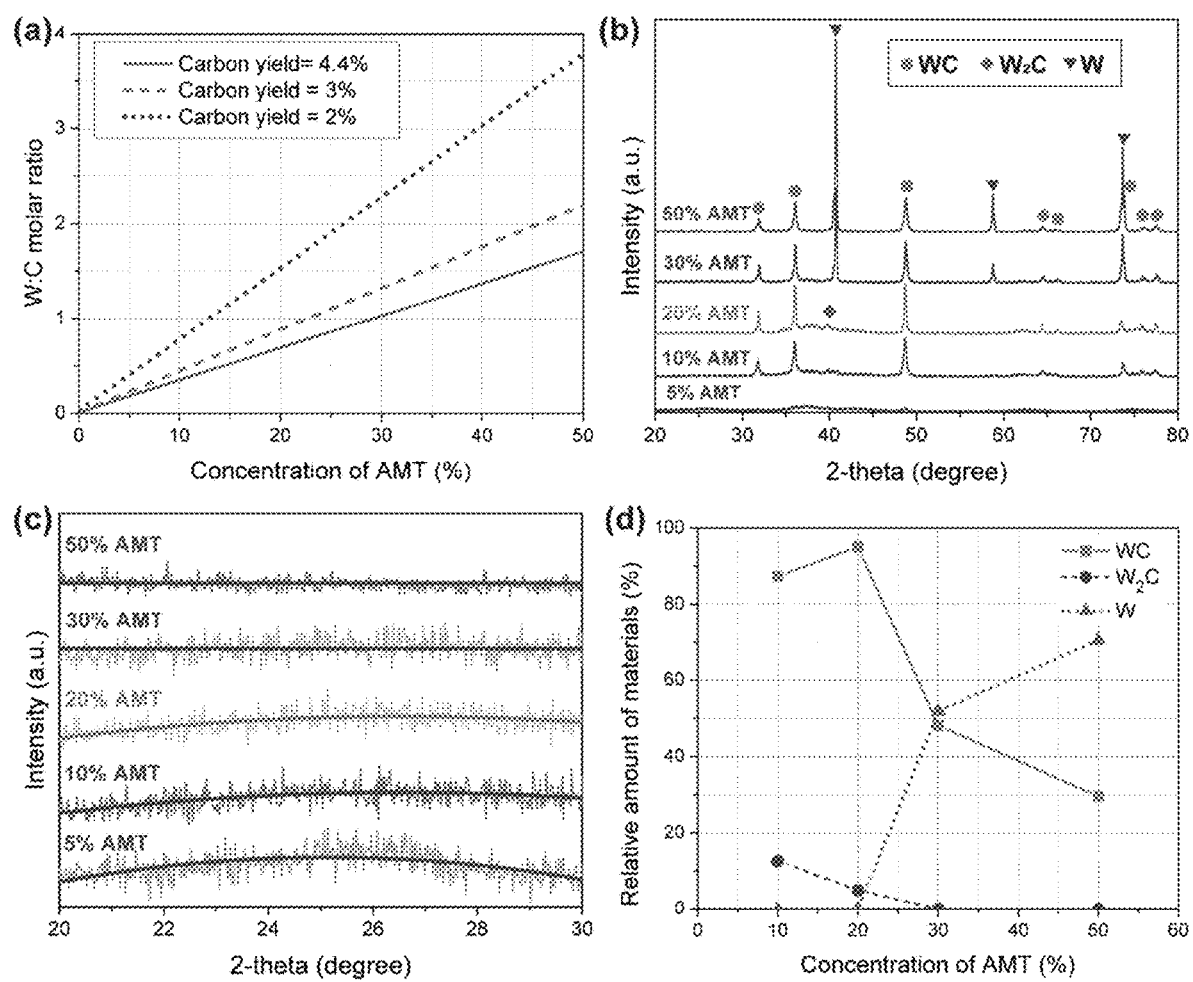
FIG. 14 presents at (a) the molar ratio between tungsten (W) and carbon (C) estimated analytically based on ammonium metatungstate (AMT) absorbed by cellulose paper during infiltration. At (b) is presented XRD patterns for samples obtained using different concentration of AMT. At (c) is presented XRD patterns zoomed in the range $2\theta=20°$ to $2\theta=30°$. At (d) is presented the effect of the concentration of AMT on the relative amount of the crystalline phase materials present in the samples.

The amount of AMT was varied to alter the stoichiometry in the system. In particular, reduced amounts of AMT were found to yield higher levels of amorphous carbon, while higher levels of AMT yielded an excess of tungsten. The effect of AMT concentrations in the range 5%-50% was examined. As indicated in FIG. 14 at (a), a molar ratio W:C of 1 was achieved at an AMT concentration close to 30%. These calculations were obtained using a CG carbon yield percentage obtained in nitrogen atmosphere and not considering the carbon required for the reduction of $WO_3$. The use of a vacuum atmosphere was expected to result in a lower carbon yield than when using nitrogen. However, the exact value for the CG paper used here was estimated with the actual amount of carbon available for the reaction with the metallic W to be lower than the 4.4% originally assumed. To explore the effect of lower carbon yields, the estimated molar ratio of W:C when the carbon yield is 2% and 3% was plotted (FIG. 14 at (a)). A ratio of 1 was achieved at AMT concentration of 13% and 23% respectively.

The AMT infiltrated precursors were heat treated at 1300° C. as described. The results from XRD characterization (FIG. 14 at (b) and (c)) indicated that AMT concentrations less than 10% led to an excess of carbon, an AMT concentration of 10-20% provided samples in which WC appeared dominant, with small peak for $W_2C$; and AMT concentrations ≥30% yielded a clear excess of W, with WC present and no traces of $W_2C$.

A closer inspection of the XRD patterns for the samples with 10% and 20% AMT revealed that a significant amount of carbon was still present as indicated by the bulging curve between 2θ=20° to 2θ=30° in the XRD pattern (FIG. 14 at (c)). The plot of the crystalline composition of the sample for different AMT concentrations (FIG. 14 at (d)) shows that the relative amount of WC was about 95.50% for 20% AMT compared to 87.35% for 10% AMT. Hence, it was inferred that in the case of 20% AMT, more WC was formed, and more carbon was consumed to form WC. With further increase of the AMT concentration to 30% or above, the bulging curve for the amorphous carbon in the XRD pattern became flat, which suggested all the carbon was consumed to form WC. However, metallic W became the dominant material in the sample.

Figure 15:
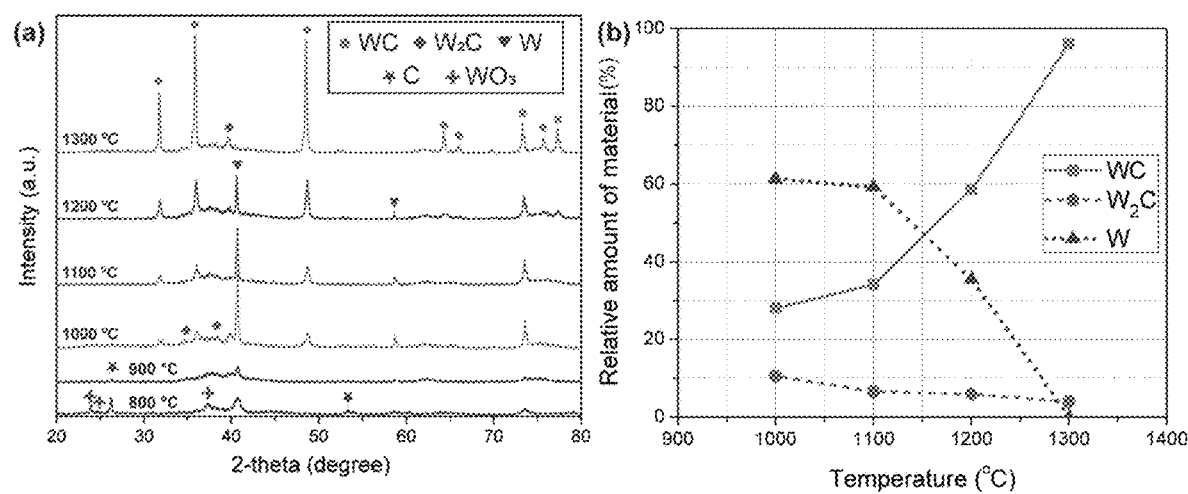
FIG. 15 includes at (a) XRD patterns for samples heat-treated at different temperatures and constant heating rate (2.5° C./min) and add-on concentration, and at (b) is provided relative amount of the crystalline materials present in the samples heat-treated at different temperature.

The XRD patterns of products infiltrated with 20% AMT and heat-treated at 2.5° C./min to different temperatures in the range 800° C.-1300° C. are shown in FIG. 15 at (a). The relative proportion of the crystalline materials present in the sample using the XRD patterns is plotted in FIG. 15 at (b) as calculated with the below equation:

$$\text{Relative amount of } X = \frac{\text{Sum of the intensities of the peaks for } X \text{ in XRD}}{\text{Sum of the intensities fo all the peaks present in XRD}} \times 100\%$$

At 800° C., the peaks in the XRD pattern correspond to $WO_3$. As the temperature increased, $WO_3$ reduced to W followed by reaction with carbon to generate WC. The reduction of $WO_3$ to metallic W completed at a temperature between about 800° C. and about 900° C. as evidenced by the wide peak around 2θ=40.3° at 900° C. and the disappearance of the peaks at 2θ=23.94°, 24.84° and 53.36°, which are characteristic peaks of $WO_3$. WC was not observed below 900° C. The presence of amorphous carbon in the system was deduced by the bulge between the angles 2θ=20° to 2θ=30° in the XRD spectra. At 1000° C., peaks for WC and $W_2C$ appeared but metallic W was still the dominant material in the sample. The relative amount of WC increased proportionately with temperature until becoming the dominant phase around 1200° C. At 1300° C., the relative amount of W became zero, which suggested complete carburization of the metallic W. Although the amount of $W_2C$ decreased with temperature, a small amount of $W_2C$ was still present in the sample at 1300° C. At this temperature, the amount of WC was 96% and the rest of 4% was $W_2C$. It is believed that the $W_2C$ would completely carburize to WC by heating above 1400° C.

Figure 16:
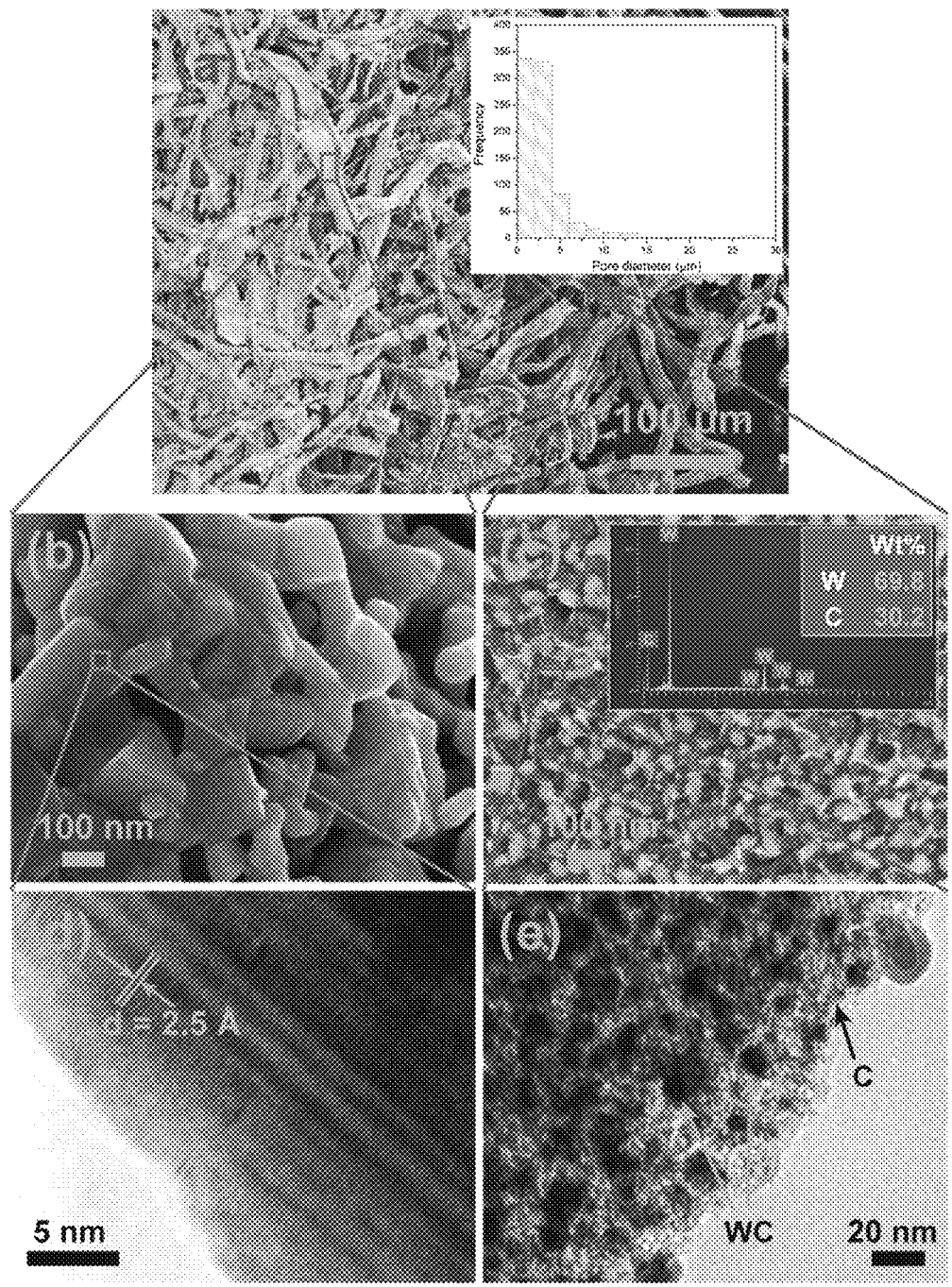
FIG. 16 illustrates the microstructure of a metal carbide cellular structure formed as described including (a) FESEM image of the metal carbide fibers, (b) higher magnification FESEM image of the fibers from the outer layer, (c) higher magnification FESEM image of the fibers from the inner layer, with a representative energy-dispersive X-ray spectroscopy (EDS) result of the inner layer fibers shown in the inset (d) HRTEM image of WC particles, and (e) HRTEM image of an inner layer fiber.
Figure 17:
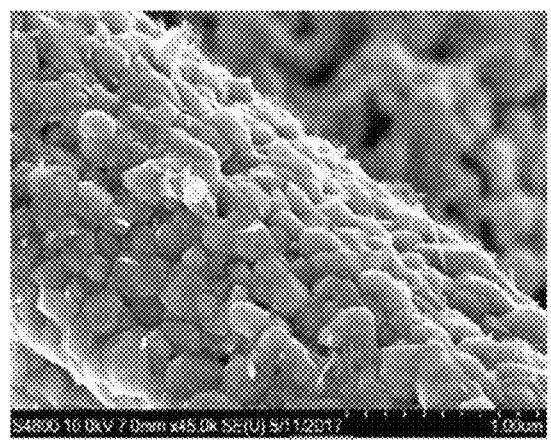
FIG. 17 provides another FESEM image of metal carbide particles decorating amorphous carbon fibers.

Microstructure images of the products are provided in FIG. 16. After heat treatment, the spacing between fibers was still random with macroporosity of the samples in the range from 1.04 μm to 28.34 μm (inset of FIG. 16 at (a)). Interestingly, the microstructure of the fibril network on the outer layer was different from that in the inner layer. The average diameter of fibers forming the outer layer was 10.88±2.05 μm, whereas the fibers in the inner layers featured an average diameter of 15.62±1.73 μm. Higher magnification FESEM images further showed that the fibers on the outer layer were composed of what seemed to be homogeneous grains (FIG. 16 at (b)). TEM studies showed how the WC grains at the outer layers feature a lattice spacing of 2.5 Å (FIG. 16 at (d)), which corresponds to the (100) plane of hexagonal WC. On the contrary, inner-layer fibers appeared to be amorphous carbon decorated with solid particles in the higher magnification FESEM (FIG. 16 at (c)), which was further confirmed by the TEM as shown in FIG. 16 at (e). Using the EDS analysis (inset of FIG. 16 at (e)) of the inner-layer, the weight ratio between WC and carbon in the inner layer fibers was estimated to be 2.59±0.39. FIG. 17 provides another image showing the WC particles on the surface of amorphous carbon fibers.

The initial hypothesis to explain such inhomogeneity in the sample was the inhomogeneous infiltration of the AMT solution across the cross-section of the paper. To test this hypothesis, the paper was infiltrated with a colored AMT solution (using food coloring at 10 v/v %). However, this hypothesis was ruled out after a homogenous color across the cross-section of the AMT infiltrated paper was observed under the microscope. The effect of dwell time and temperature was then considered, following the rationale that the reaction between W and C throughout the sample was incomplete at 1300° C. However, XRD results showed how at 1300° C. there was no W left in the system to react with the carbon. It is believed that the evaporation of water occurring after AMT infiltration may be the cause for material inhomogeneity. During evaporation, water may aid on the transport of AMT to the outer layer and the correspondent depletion of AMT in the inner layers. Moreover, the reduction of AMT begins with the decomposition of AMT to $WO_3$, gaseous ammonia ($NH_3$) and water ($H_2O$), which is followed by the reaction between $H_2O$ with $WO_3$ to form $WO_2(OH)_2$, a volatile byproduct that may get redeposited on the outer layer fibers. Both processes can lead to a change in stoichiometry and material inhomogeneities across the material.

The structures were derived with a structural density around 0.06 g/cm³, or 0.38% of an equivalent prism made of solid WC. Shrinkage of occurred due to elimination of byproducts generated during the carbonization of the cellulose and the reduction of the AMT. The shrinkage in the lateral direction was mostly attributed to the geometry of the 3D precursor as described above.

Figure 18:
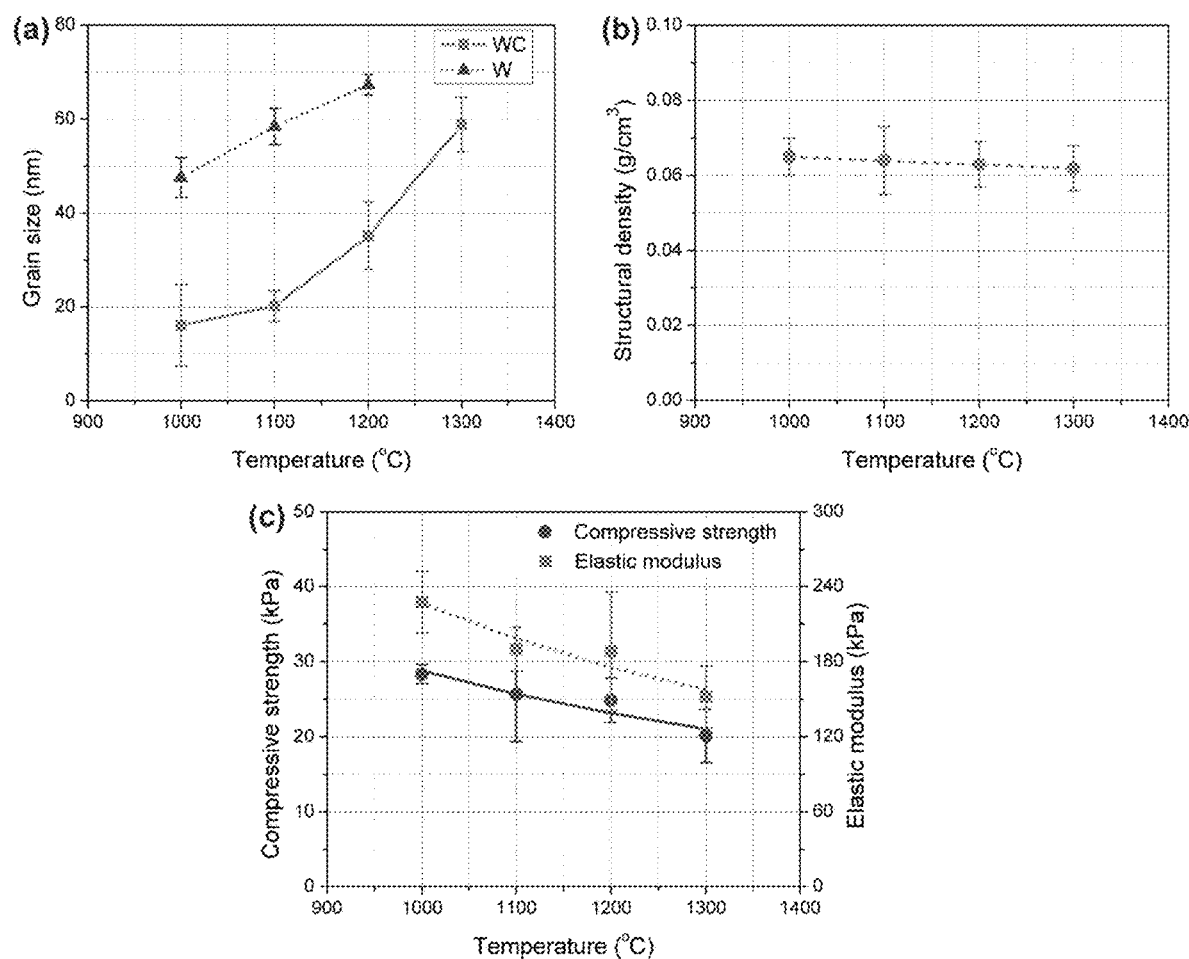
FIG. 18 presents at (a) the effect of synthesis temperature on the grain size of WC and W in the cellular structures, at (b) is provided structural density of samples obtained at different temperatures, at (c) is presented compressive strength and elastic modulus of samples heat-treated at different temperature.

The compressive strength and elastic modulus of the structures formed in the temperature range 1000° C.-1300° C. is reported in FIG. 18 at (c). The decreases of −28.93±0.23% and −33.29±1.61% on the compressive strength and elastic modulus were not expected given that WC gradually becomes the dominant material in the sample in this temperature range. The decrease in the mechanical properties was not due to structural density as this remained uniform (FIG. 18 at (b)) but could be attributed to the properties of the constituent materials, namely WC, W, $W_2C$ and amorphous carbon. The grain size of WC and W present in the materials formed at different temperatures is shown in FIG. 18 at (a). The contribution of $W_2C$ was insignificant and is not reported. The grain size of WC increased from 16.1±8.63 nm for structures formed at 1000° C. to 58.88±5.81 nm for structures formed at 1300° C. while that of metallic W increased from 47.6±4.22 nm for structures formed at 1000° C. to 67.3±2.19 nm for structures formed at 1200° C. It should be noted here that a range of compressive strength and elastic modulus was obtained by changing the processing temperatures and without changing the density of the structures.

EXAMPLE 3

Three renewable biopolymer film precursors were used including chromatography (CG) paper, bacterial cellulose (BC) films, and rice paper. Pure cellulose chromatography paper with thickness of 0.19 mm was purchased from Fisher Scientific (Fisherbrand Chromatography Paper, Cat. No. 05-714-1). The BC pellicle was prepared following a known synthesis procedure. Briefly, *Komagataeibacter xylinus* strain ATCC 700178 was cultured in Hestrin and Schramm (HS) media in 60 mm-diameter petri dishes for 14 days to attain a pellicle thickness of around 5 mm. The BC pellicle was washed in 0.1 (M) NaOH solution for 12 hours to eliminate bacteria, followed by rinsing in distilled water until a neutral pH was achieved. Critical point drying (Quarum Technologies, United Kingdom) was performed in the case of BC pellicle so that the 3D interconnected nanofibril structure of BC was retained during the carbonization. Rice paper was purchased as Banh Trang from Amazon (Three Ladies Brand). CG and rice paper were used as received.

Water-soluble ammonium meta-tungstate (AMT) was used as the tungstate precursor (Sigma Aldrich Cat. No. 463922). 20% (wt. %) AMT solution was prepared by adding 20 g AMT in 100 ml of ultra-pure water and stirring on a magnetic stirrer (Thermolyne Nuova, United States) for 15 minutes. All biopolymer films were immersed in the AMT solution for 15 minutes for infiltration, and immediately introduced into a tube furnace afterwards without any drying process in between.

All samples were carbonized in a tube furnace (TF1700, Across International, USA). Two heat treatment protocols were used. The first was used for carbonization of the biopolymer films and featured a heating protocol that included (i) heating from room temperature to 300° C. at a heating rate of 5° C./min; (ii) dwell at 300° C. for 30 minutes to ensure complete evacuation of any oxygen in the heating tube; (iii) heating from 300° C. to 900° C. with a heating ramp of 5° C./min; (iv) dwell at 900° C. for 75 minutes; and (v) cooling down to room temperature at a cooling rate of 5° C./min. The entire heat treatment process was carried out under nitrogen flow (10 standard cubic feet per hour).

The second protocol was used to heat treat the biopolymer films infiltrated with AMT and was similar to that used for carbonization. Differences were different final synthesis temperatures in the step (iii); and a dwell time of 3 hours at the final temperature in step (iv). The final temperature at step (iii) was varied from 1100° C. to 1300° C. to identify the lowest temperature to produce WC without any other crystalline phases. The entire heat-treatment process of the AMT-infiltrated samples was performed in a vacuum environment (vacuum pressure=−762 Torr).

Material characterizations were carried out as described above.

Figure 19:
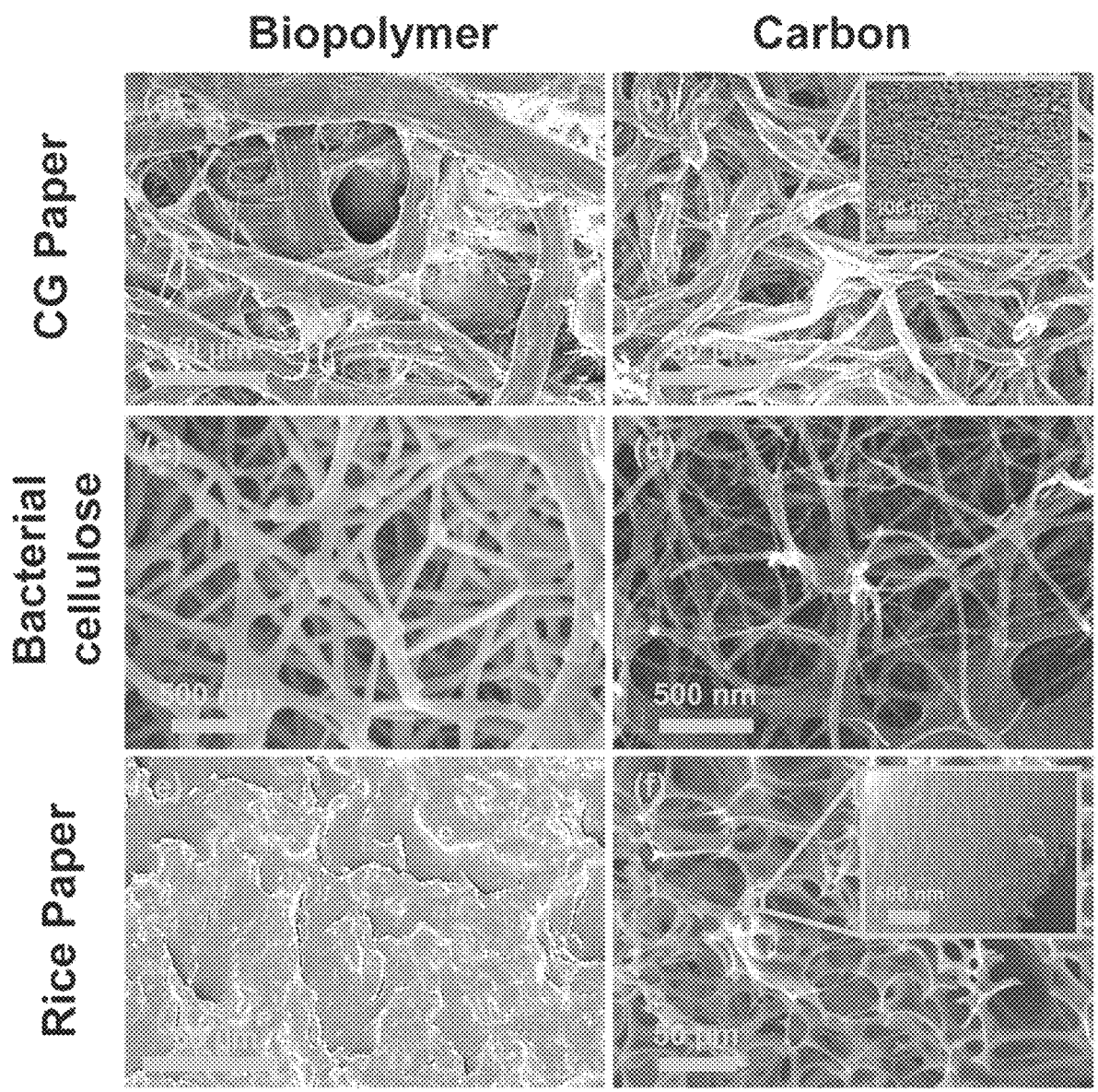
FIG. 19 presents the microstructure of (a) chromatograph (CG) paper, (b) carbonized CG paper, (c) bacterial cellulose (BC) film, (d) carbonized BC, (e) rice paper, and (f) carbonized rice paper. Insets show the mesoporous structure of carbonized materials of the referenced image.

As illustrated in FIG. 19, CG paper and BC are random networks of cellulose fibers (a) and (c), with the BC fibers being three dimensionally interconnected as shown in FIG. 19 at (c). As shown, the CG paper and the BC film feature a fibril network, whereas the microstructure of the rice paper (FIG. 19 at (e)) resembles a dried paste-like structure. Following carbonization, the CG paper (FIG. 19 at (b)) and the BC film (FIG. 19 at (d)) retain the fibril network of the precursor. The average diameter of the carbon fibers of the product formed from the CG paper was 5.26±2.53 μm, indicating a linear shrinkage of 69.89±5.59% during carbonization. The structure exhibited macropores of varying dimensions ranging from 1.56 μm to 21.71 μm. Higher magnification SEM images showed mesoporous structure of the carbon fibers (inset of FIG. 19(*b*)) with a pore diameter ranging from 3.15 nm to 44.78 nm. The fibers were non-bonded and overlapped to each other. Thermal shrinkage due to the elimination of hydrogen and oxygen atoms is believed to have caused the fibers to detach from each other, which would result in significantly weaker bonding among the fibers by van der Waal or coulombic forces. In addition, thermal shrinkage resulted in the collapse of most of the lumen structures, yielding flattened fibers as shown in FIG. 19 at (b).

The carbonized BC film was also a random network of fibrils which formed a three-dimensionally inter-connected network (FIG. 19 at (d)). The carbon fibers from BC featured an average diameter of 21.33±8.96 nm. Around 60% shrinkage of the fiber diameter occurred during the carbonization process. The interconnected network of the fibers resulted in a large number of micro (pore size less than about 2 nm) and mesopores (pore size about 2 nm to about 50 nm).

The carbonization of rice paper yielded a stochastic foam of carbon featuring open cells, which was quite different from the microstructure of rice paper. The thickness of the carbonized rice sample also looked swollen when compared to the precursor rice paper. This is likely due to the use of baking powder as an additive in the rice paper preparation. It was hypothesized that the swelling of the rice paper might have happened during the initial stage of heating, which caused a porous stochastic foam-like structure in the precursor itself. The carbonization might have occurred at the swollen state, which resulted in a stochastic foam like structure of carbonized structure. The distribution of the open cells was random, and the diameter of the open cells ranged from 12 to 250 μm. High magnification SEM of the struts of the stochastic foam shows that the struts feature a rough surface (Inset of FIG. 19 at (f)).

Figure 20:
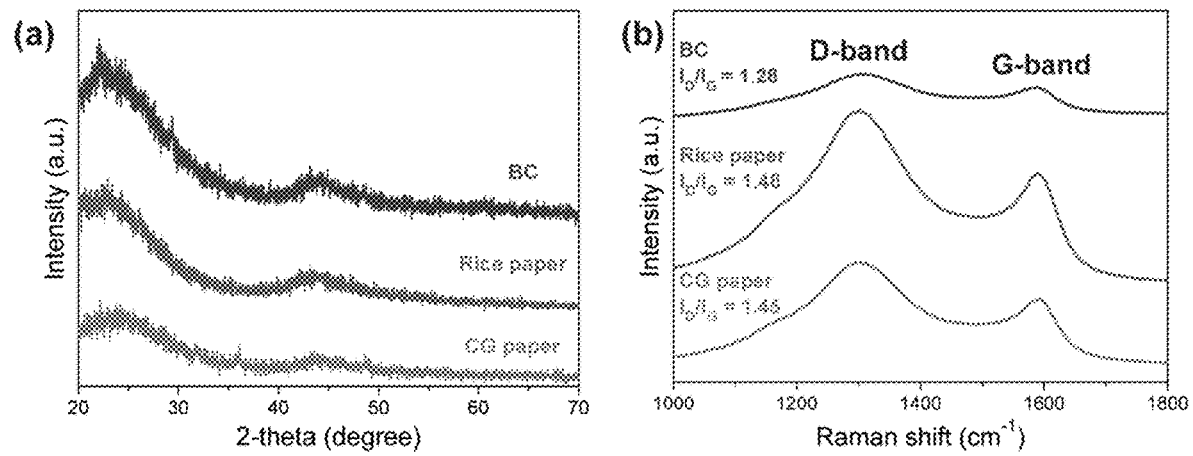
FIG. 20 presents XRD (a) and Raman (b) spectra of sample obtained after carbonization.

FIG. 20 shows the XRD pattern (a) of the materials obtained from the pyrolysis of the precursors. Weak and broad peaks are centered around 2θ=24° and 2θ=43° in all XRD patterns. As these are the reflections of the (022) and (100) planes of carbon, it was concluded that these samples were carbon of amorphous nature. However, the peaks for the carbon derived from BC were sharper than those obtained from the other two precursors; suggesting that the carbon from the BC is more crystalline than carbon obtained from CG paper and rice paper. This was confirmed by Raman spectroscopy of the carbon samples (b). Two characteristic peaks can be observed in between 1000 cm$^{-1}$ and 1800 cm$^{-1}$ in the Raman spectra of each carbon sample. The peak around 1300 cm$^{-1}$ is D-band, which represents the disordered carbon present in the sample. The other peak, which is around 1580 cm$^{-1}$ is G-band, representative of the crystalline planes of carbon present in the sample. The ratio of the intensities of D-band (ID) and G-band (IG) represents the degree of graphitization of the carbon sample. For pure graphite, the ratio ID/IG approaches zero. A lower value of ID/IG suggests higher crystallinity of the carbon material. The ratio for BC derived carbon is 1.28, whereas the ratio is 1.48 and 1.45 for rice paper and CG paper derived carbon respectively, clearly indicating that the carbon derived from BC is the most crystalline of the three carbon samples studied here.

Figure 21:
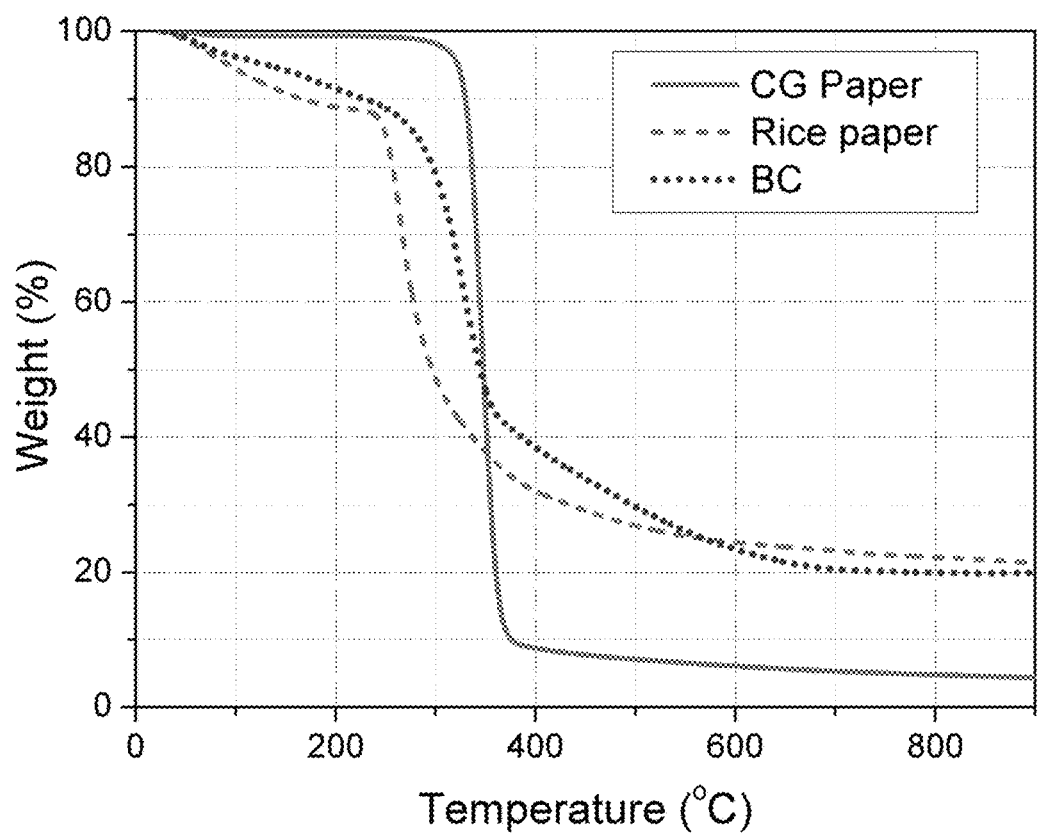
FIG. 21 presents the TGA of CG paper, BC and rice paper with a heating rate of 5° C./min in nitrogen environment.

TGA was used to estimate the carbon yield from each of the studied precursors. In general, all of the polymers exhibited similar TGA curves but with important differences in their carbon yield (FIG. 21). For CG paper, the carbon yield at 900° C. was only 4.3% of the initial weight, which is in agreement with that previously reported by other authors. The thermal degradation of cellulose in CG started at 260° C., which corresponds to the reported temperature at which the β glyosidic bond of cellulose cleaves. A drastic weight loss of 89.71% happened in the temperature range 260° C.-380° C. and was attributed to the release of the volatile by-products of cellulose decomposition. Above 380° C., a gradual weight loss with a loss rate of 0.0097%/° C. was observed, as described above.

In contrast to CG, the carbon yield from BC was 20%. This difference is attributed to the difference in degree of polymerization (DoP) between CG and BC. It is believed that the carbon chains in a precursor polymer with high DoP remain closer to each other in the temperature range 600° C.-650° C. Thus, the carbon atoms may start forming sp2 bonds with the adjacent atoms relatively easily, which also restricts the rate of production of volatile compounds. The carbon yield of rice paper at 900° C. was the highest of the three precursors at 21.4%. This difference was attributed to the fact that the commercial rice paper used had additives at unknown concentrations, including protein, vitamin B6, sugar and salt. The mechanism of carbonization for starch is expected to be different from cellulose due to the presence of the amylose and amylopectin chains. For starch, the initiation point of the thermal decomposition, around 240° C., depends on the ratio of amylose and amylopectin.

Figure 22:
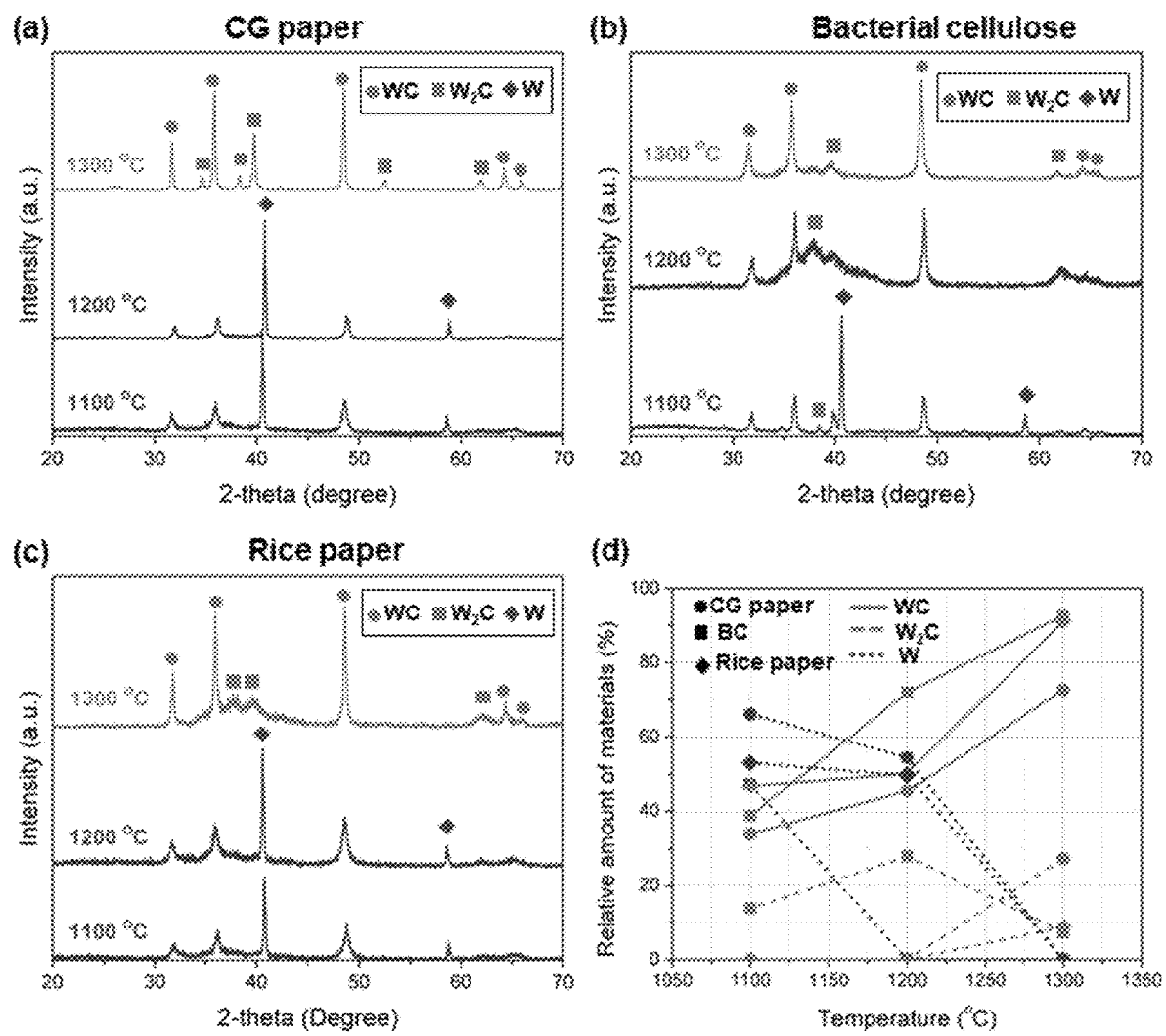
FIG. 22 includes XRD patterns of tungsten carbide cellular structures formed from (a) CG paper precursor, (b) bacterial cellulose precursor, and (c) rice paper precursor. At (d) is shown the relative amount of WC, $W_2C$, and W in the product structure obtained with heat treatment temperature for all the three biopolymer precursors.

The XRD patterns of the samples obtained from all the three biopolymers infiltrated with 20% AMT and heat treated at different temperatures are presented in FIG. 22. As expected, three crystalline materials were clearly visible in the system: tungsten W, tungsten carbide WC and tungsten hemicarbide W$_2$C. The proportion of each of these materials in the samples depending on heat treatment temperature is illustrated in FIG. 22 at (d). At 1100° C. heat treatment, all the three precursors showed a strong and dominant presence of metallic W, with WC being the other crystalline material in the sample. In case of BC, small peaks for W$_2$C can already be observed in the XRD pattern. For all the three biopolymers, the amount of WC increased with increasing heat treatment temperature, whereas the amount of metallic W decreased. This confirmed previous reports that the carburization of W depends on temperature. However, the reaction proceeded faster in the case of BC. The complete carburization of W particles happened at different temperatures depending on the choice of carbon precursor. For BC, the amount of metallic W became zero at a heat treatment temperature of 1200° C., which signifies the complete carburization of W particles. In contrast to BC, the complete carburization of W particles occurred at a heat treatment temperature of 1300° C. for both CG paper and rice paper to yield 73% and 91% WC respectively. At 1300° C., BC yielded around 93% WC. Hence, the use of BC yields a higher WC yield and seems to facilitate the reaction between W and C at lower temperatures when compared to CG and rice paper. This can be attributed to the crystallinity to the carbon obtained from the biopolymers. As BC derived carbon features higher crystalline regions compared to the carbon derived from CG paper and rice paper, BC derived carbon may require less energy in the carburization reaction. This results in lower carburization temperature for BC.

W$_2$C remained present in all the samples at 1300° C. The highest W$_2$C percentage was 27% for CG paper while it was 8 and 9% for BC and rice paper respectively. The hypothesis is that these conditions can depend on the microstructure of the carbon material.

Figure 23:
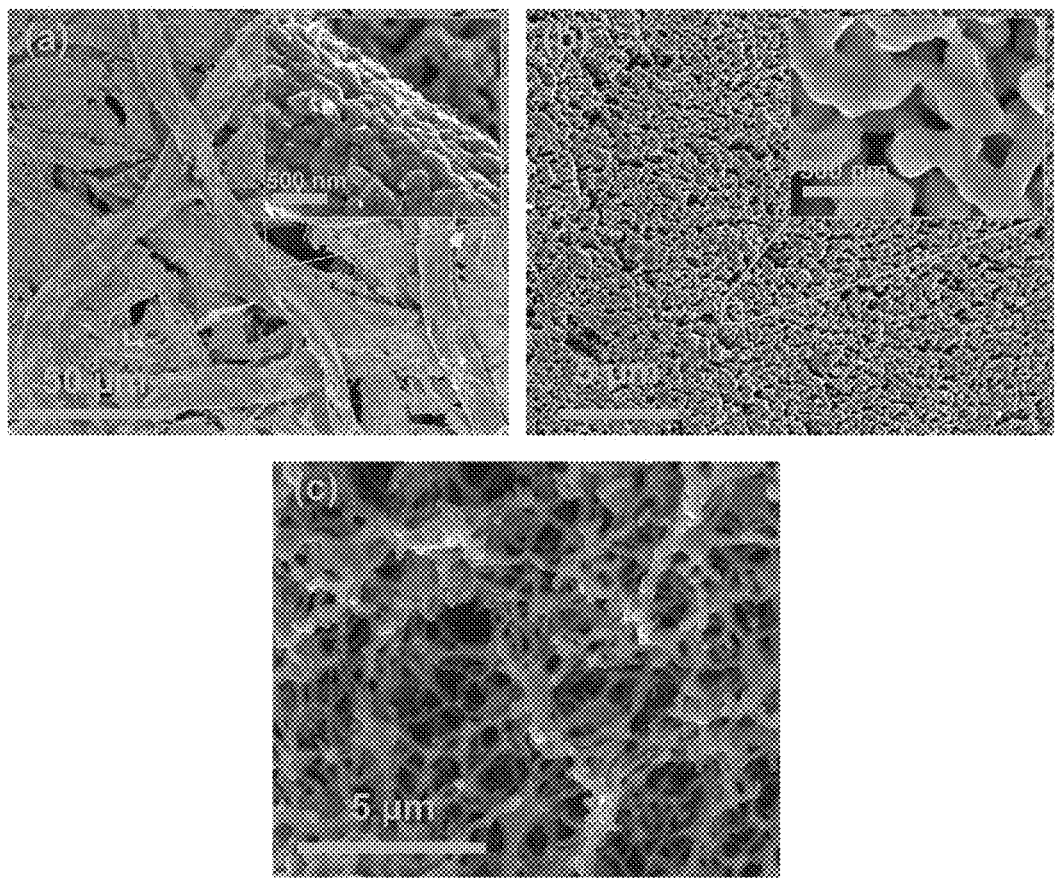
FIG. 23 includes FESEM images of the WC obtained from a precursor formed of (a) CG paper, (b) BC, and (c) rice paper.

FIG. 23 shows the morphology of the WC obtained from the CG paper (a) and BC (b). In both cases, the WC retained the fibril structure of its precursor, but the fiber dimensions increased in different degrees. The average fiber diameter of the WC fibers from CG paper was 10.34±2.79 μm, which is larger than the diameter of the fibers obtained after carbonization of the untreated cellulose fibers at 900° C. The nucleation of the crystalline intermediates inside the carbon matrix during the reduction of AMT may hinder the thermal shrinkage of the fibers, which yield larger fiber diameter than the carbon fibers.

In the WC material derived from BC, the average diameter of the fibers was 177.16±17.11 nm, which is almost 2 times larger than the carbonized fibers from BC. It is believed that the hydrophilic nature of the BC is responsible for the increase in the diameter.

Upon heat treatment, the rice paper lost its unique cellular structure and formed a porous structure of the agglomerated WC particles during the formation of WC FIG. 23 at (c). The starting material for WC synthesis in the rice paper precursor is a starch sol infiltrated with AMT solution. The carbide synthesized from an aqueous sol precursor is expected to feature a porous structure of agglomerated grains of carbides, which agrees with the microstructure of the final product obtained from the heat treatment of AMT infiltrated rice paper. The average grain size of the WC synthesized from the rice paper was estimated to be 38.76±6.27 nm.

CG paper can be easily folded into 3D complex origami shapes as described in above examples. Foldability of the BC sheet and rice paper into origami shapes was more challenging. In wet conditions, handling BC sheets or rice paper was difficult as it was prone to tear apart. However, BC sheets and rice papers are brittle when dry. Experiments with dried BC sheets and rice paper resulted in cracks or fractures of the sheet during pre-creasing and folding.

Figure 24:
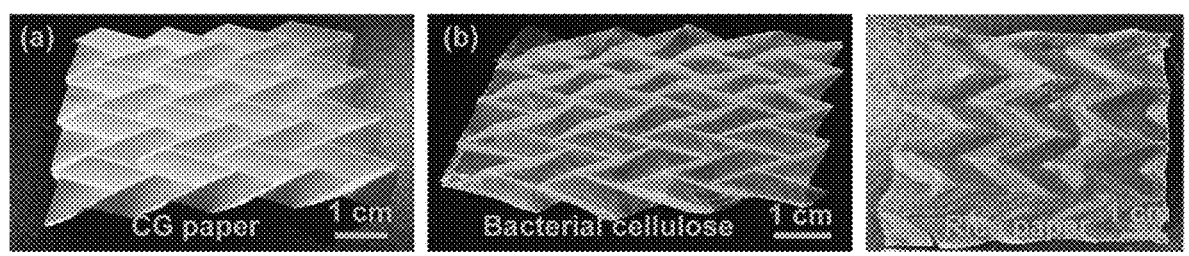
FIG. 24 illustrates a 3D precursor fabricated by automatic pre-creasing and manual folding of CG paper (a), a 3D precursor fabricated by applying oil on a BC sheet to increase its flexibility followed by pre-creasing and manual folding (b), and a 3D precursor shape fabricated by molding wet rice paper in a mold followed by drying inside the mold (c).

FIG. 24 illustrates a 3D precursor formed by shaping a CG sheet (a) as described previously. To improve folding characteristics of the BC-based precursor, a 3D shape was fabricated using an oiled BC sheet (FIG. 24 at (b)). As another formation process, an external mold was used to shape a piece of rice paper in wet conditions that was then allowed to dry inside the mold (FIG. 24(c)).

While certain embodiments of the disclosed subject matter have been described using specific terms, such description is for illustrative purposes only, and it is to be understood that changes and variations may be made without departing from the spirit or scope of the subject matter.

What is claimed is:

1. A method for forming a cellular structure, the method comprising:
   shaping an essentially two dimensional sheet by folding to form a three dimensional precursor, the sheet comprising an organic biopolymer, and the three dimensional precursor comprising a plurality of individual cells;
   contacting the sheet or the three dimensional precursor with a solution comprising a metal; and
   heat treating the three dimensional precursor, the heat treatment carbonizing the organic polymer of the sheet and forming a carbon-based cellular structure, and the heat treatment forming on or in the cellular structure a metal carbide via a reaction between the metal and a carbon of the organic polymer or metal nanoparticles comprising the metal.

2. The method of claim 1, the organic polymer comprising a polysaccharide.

3. The method of claim 1, the biopolymer comprising cellulose or starch.

4. The method of claim 3, the cellulose comprising plant cellulose or bacterial cellulose.

5. The method of claim 1, further comprising contacting the sheet or the three dimensional precursor with the solution prior to the step of heat treating the three dimensional precursor by immersion or under the force of vacuum.

6. The method of claim 1, the solution comprising tungsten as the metal.

7. The method of claim 1, the step of heat treating the three dimensional precursor forming the metal carbide via a reaction between the metal and a carbon of the organic polymer.

8. The method of claim 1, the step of heat treating the three dimensional precursor forming the metal nanoparticles comprising the metal.

9. The method of claim 1, the solution contacting only a portion of the sheet or only a portion of the three dimensional precursor.

10. The method of claim 1, the carbon-based cellular structure comprising vitreous carbon.

11. The method of claim 1, wherein the three dimensional precursor has an origami-based shape.

12. The method of claim 1, the step of heat treating comprising heating the three dimensional precursor at a temperature of from about 600° C. to about 1800° C.

* * * * *